US011123864B2

(12) United States Patent
Iwasa et al.

(10) Patent No.: US 11,123,864 B2
(45) Date of Patent: Sep. 21, 2021

(54) MOTION TEACHING APPARATUS, ROBOT SYSTEM, AND MOTION TEACHING METHOD

(71) Applicant: KABUSHIKI KAISHA YASKAWA DENKI, Kitakyushu (JP)

(72) Inventors: Toshihiro Iwasa, Kitakyushu (JP); Ryoichi Nagai, Kitakyushu (JP); Nathanael Mullennix, Kitakyushu (JP); Shingo Ando, Kitakyushu (JP); Kenichi Yasuda, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 324 days.

(21) Appl. No.: 16/459,622

(22) Filed: Jul. 2, 2019

(65) Prior Publication Data

US 2020/0001454 A1 Jan. 2, 2020

(30) Foreign Application Priority Data

Jul. 2, 2018 (JP) .............................. JP2018-126334

(51) Int. Cl.
*B25J 9/16* (2006.01)
*B25J 9/02* (2006.01)

(52) U.S. Cl.
CPC .............. *B25J 9/163* (2013.01); *B25J 9/023* (2013.01); *B25J 9/1664* (2013.01)

(58) Field of Classification Search
CPC . B25J 9/163; B25J 9/023; B25J 9/1664; B25J 9/0081; B25J 9/1656; G05B 19/42

(Continued)

(56) References Cited

U.S. PATENT DOCUMENTS 4,700,118 A   10/1987  Kishi et al.
4,763,276 A *  8/1988  Perreirra ............... B25J 9/1653
                                                 700/254

(Continued)

FOREIGN PATENT DOCUMENTS

JP    S61-204705 A    9/1986
JP    H05-111897 A    5/1993

(Continued)

OTHER PUBLICATIONS

Japanese Office Action for corresponding JP Application No. 2018-126334, dated Aug. 27, 2019 (w/ machine translation).

(Continued)

*Primary Examiner* — Jaime Figueroa
(74) *Attorney, Agent, or Firm* — Mori & Ward, LLP

(57) ABSTRACT

A motion teaching apparatus includes a teaching motion detection device, a demonstration tool, and circuitry. A robot includes a leading end to move in a first coordinate system. A teaching motion detection device detects a position of the demonstration tool in a second coordinate system. The circuitry derives a relationship between the first and second coordinate system based on a position of the demonstration tool in the first coordinate system at at least one spot and based on the position of the demonstration tool in the second coordinate system at the at least one spot; obtains a transition of the position of the demonstration tool during the demonstration using the demonstration tool; and generates a motion command to control motion of the leading end of the robot based on the transition and the coordinate system relationship information.

23 Claims, 17 Drawing Sheets

(58) Field of Classification Search
USPC .................................................. 700/245–264
See application file for complete search history.

(56) References Cited

U.S. PATENT DOCUMENTS

| | | | | |
|---|---|---|---|---|
| 5,353,386 | A * | 10/1994 | Kasagami | B25J 9/1682 |
| | | | | 700/247 |
| 5,495,090 | A * | 2/1996 | Mukai | B23K 9/127 |
| | | | | 219/124.34 |
| 5,495,410 | A | 2/1996 | Graf | |
| 5,617,515 | A * | 4/1997 | MacLaren | B25J 9/1656 |
| | | | | 414/5 |
| 5,880,956 | A | 3/1999 | Graf | |
| 6,019,606 | A | 2/2000 | Yamamoto et al. | |
| 6,366,831 | B1 | 4/2002 | Raab | |
| 6,822,412 | B1 * | 11/2004 | Gan | B25J 9/1692 |
| | | | | 318/568.11 |
| 6,853,881 | B2 * | 2/2005 | Watanabe | B25J 9/1671 |
| | | | | 219/121.63 |
| 7,714,895 | B2 * | 5/2010 | Pretlove | G05B 19/427 |
| | | | | 348/211.2 |
| 9,782,895 | B2 * | 10/2017 | Kanada | B25J 9/1656 |
| 10,107,619 | B2 * | 10/2018 | Pettersson | G06F 3/0488 |
| 10,166,673 | B2 * | 1/2019 | Orman | G06F 3/04883 |
| 2005/0067995 | A1 * | 3/2005 | Weinhofer | G05B 19/19 |
| | | | | 318/574 |
| 2005/0071021 | A1 * | 3/2005 | Weinhofer | B25J 9/1664 |
| | | | | 700/63 |
| 2006/0178778 | A1 * | 8/2006 | Fuhlbrigge | G05B 19/0426 |
| | | | | 700/264 |
| 2008/0319557 | A1 * | 12/2008 | Summers | G05B 19/4015 |
| | | | | 700/19 |
| 2011/0118875 | A1 * | 5/2011 | Hosek | G05B 19/4189 |
| | | | | 700/250 |
| 2015/0321351 | A1 * | 11/2015 | Kapoor | G05B 19/427 |
| | | | | 700/264 |
| 2016/0184996 | A1 | 6/2016 | Ishige et al. | |
| 2016/0239013 | A1 * | 8/2016 | Troy | G05B 15/02 |
| 2017/0021496 | A1 * | 1/2017 | Kanada | B25J 9/1656 |
| 2018/0169854 | A1 * | 6/2018 | Shiratsuchi | B25J 9/10 |
| 2018/0243911 | A1 * | 8/2018 | Harada | B25J 9/1697 |
| 2018/0345483 | A1 * | 12/2018 | Sirkett | B25J 9/1697 |
| 2019/0061163 | A1 * | 2/2019 | Yamaguchi | B25J 9/1664 |
| 2019/0129374 | A1 * | 5/2019 | Miyamoto | G05B 19/401 |

FOREIGN PATENT DOCUMENTS

| | | |
|---|---|---|
| JP | H08-069314 A | 3/1996 |
| JP | H09-47989 A | 2/1997 |
| JP | H09-193064 A | 7/1997 |
| JP | 10-138182 | 5/1998 |
| JP | 2011-230257 A | 11/2011 |
| JP | 2015-160257 A | 9/2015 |
| JP | 2016-120531 A | 7/2016 |

OTHER PUBLICATIONS

Frank Shaopeng Cheng, "Calibration of Robot Reference Frames for Enhanced Robot Positioning Accuracy", In: "Robot Manipulators", InTech, XP055646434, ISBN: 978-953-76-1906-0, pp. 95-112, DOI: 10.5772/87, * p. 102-p. 104; figure 4, Sep. 1, 2008.

The Extended European Search Report for corresponding EP Application No. 19183816.8, dated Dec. 16, 2019.

* cited by examiner

MOTION TEACHING APPARATUS, ROBOT SYSTEM, AND MOTION TEACHING METHOD

CROSS-REFERENCE TO RELATED APPLICATIONS

The present application claims priority under 35 U.S.C. § 119 to Japanese Patent Application No. 2018-126334, filed Jul. 2, 2018. The contents of this application are incorporated herein by reference in their entirety.

BACKGROUND

Field of the Invention

The embodiments disclosed herein relate to a motion teaching apparatus, a robot system, and a motion teaching method.

Discussion of the Background

JP 10-138182 A discloses a teaching device that includes a dummy tool and means for detecting a coordinate-system position and a posture of the dummy tool in a three-dimensional space. With the dummy tool located at a position to be taught to a robot, the teaching device stores, in the form of teaching data, a coordinate-system position and a posture of the dummy tool in the three-dimensional space.

SUMMARY

According to one aspect of the present disclosure, a motion teaching apparatus includes a demonstration device and circuitry. The demonstration device includes a demonstration tool and a teaching motion detection device. The demonstration tool is configured to perform a demonstration to teach a robot how to move. The robot includes a leading end and a multi-articular arm which is configured to change a position of the leading end in a first coordinate system. The teaching motion detection device is configured to detect a position of the demonstration tool in a second coordinate system different from the first coordinate system. The circuitry is configured to derive coordinate system relationship information indicating a relationship between the first coordinate system and the second coordinate system based on a position of the demonstration tool in the first coordinate system at at least one spot and based on the position of the demonstration tool in the second coordinate system detected by the teaching motion detection device at the at least one spot. The circuitry is configured to obtain a transition of the position of the demonstration tool detected by the teaching motion detection device during the demonstration using the demonstration tool. The circuitry is configured to generate a motion command to control motion of the leading end of the robot based on the transition and based on the coordinate system relationship information.

According to another aspect of the present disclosure, a robot system includes a robot and a motion teaching apparatus. The robot includes a leading end and a multi-articular arm configured to change a position of the leading end in a first coordinate system. The motion teaching apparatus includes a demonstration device and circuitry. The demonstration device includes a demonstration tool and a teaching motion detection device. The demonstration tool is configured to perform a demonstration to teach the robot how to move. The teaching motion detection device is configured to detect a position of the demonstration tool in a second coordinate system different from the first coordinate system. The circuitry is configured to derive coordinate system relationship information indicating a relationship between the first coordinate system and the second coordinate system based on a position of the demonstration tool in the first coordinate system at at least one spot and based on the position of the demonstration tool in the second coordinate system detected by the teaching motion detection device at the at least one spot. The circuitry is configured to obtain a transition of the position of the demonstration tool detected by the teaching motion detection device during the demonstration using the demonstration tool. The circuitry is configured to generate a motion command to control motion of the leading end of the robot based on the transition and based on the coordinate system relationship information.

According to the other aspect of the present disclosure, a motion teaching method includes performing a demonstration with a demonstration tool to teach a robot how to move. The robot includes a leading end and a multi-articular arm which is configured to change a position of the leading end in a first coordinate system. A position of the demonstration tool in a second coordinate system different from the first coordinate system is detected. Coordinate system relationship information indicating a relationship between the first coordinate system and the second coordinate system is derived based on a position of the demonstration tool in the first coordinate system at at least one spot and based on the position of the demonstration tool in the second coordinate system detected by the teaching motion detection device at the at least one spot. A transition of the position of the demonstration tool detected by the teaching motion detection device during the demonstration using the demonstration tool is obtained. A motion command to control motion of the leading end of the robot is generated based on the transition and based on the coordinate system relationship information.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
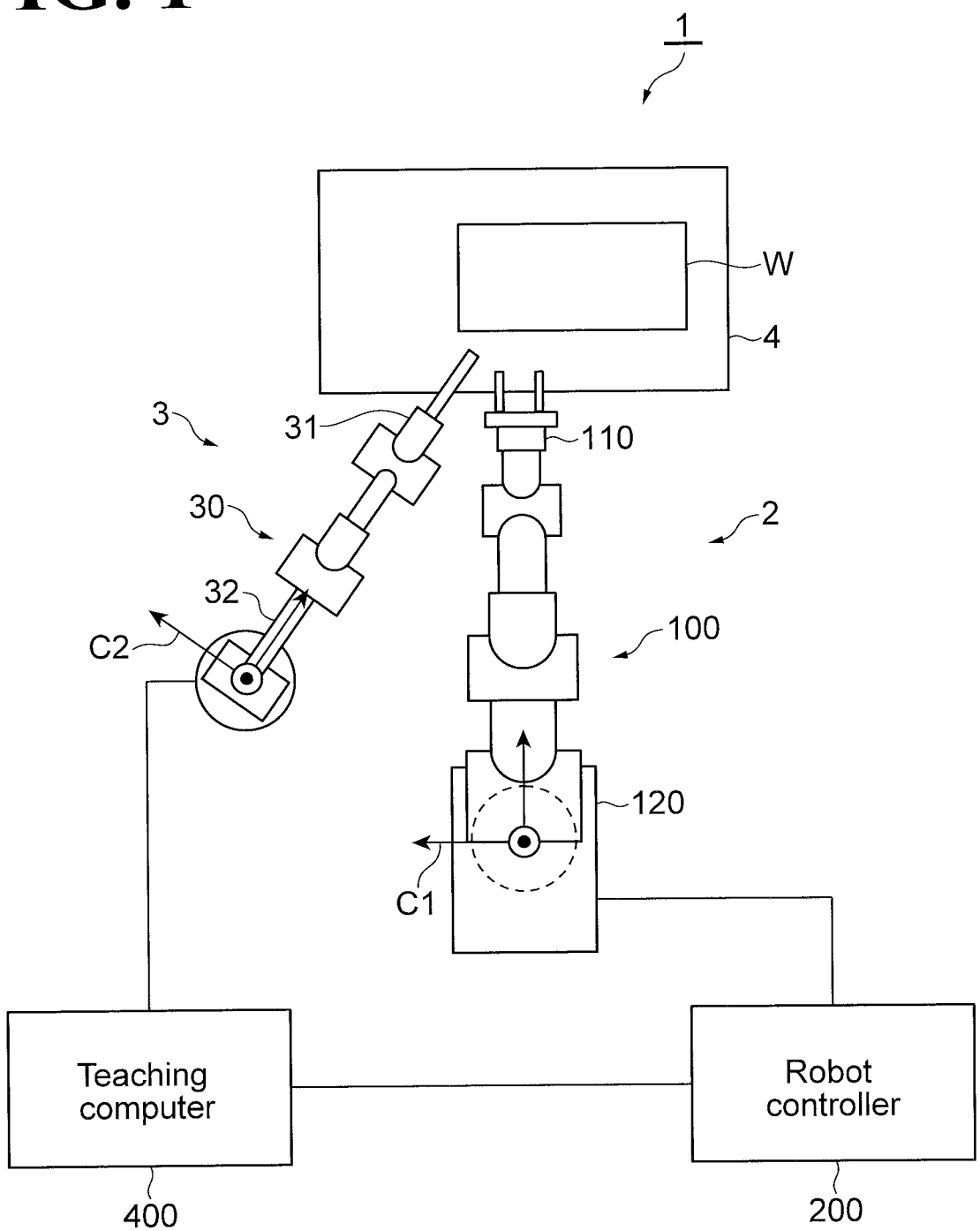
FIG. 1 is a schematic illustrating an example configuration of a robot system.

The embodiments will now be described with reference to the accompanying drawings, wherein like reference numerals designate corresponding or identical elements throughout the various drawings.

Robot System

A robot system 1 according to this embodiment is a system that performs grinding work on a workpiece W. It is to be noted that the work performed by the robot system 1 will not be limited to grinding work; the robot system 1 may cause a robot to perform any other work insofar as the work is based on a motion taught to the robot in advance. As illustrated in FIG. 1, the robot system 1 includes a robot apparatus 2 and a motion teaching apparatus 3.

Robot Apparatus

The robot apparatus 2 includes a robot 100 and a robot controller 200. The robot 100 performs grinding work on the workpiece W by pressing the workpiece W against a grinder 4. The robot controller 200 controls the robot 100 to perform grinding work on the workpiece W based on a motion taught in advance.

Figure 2:
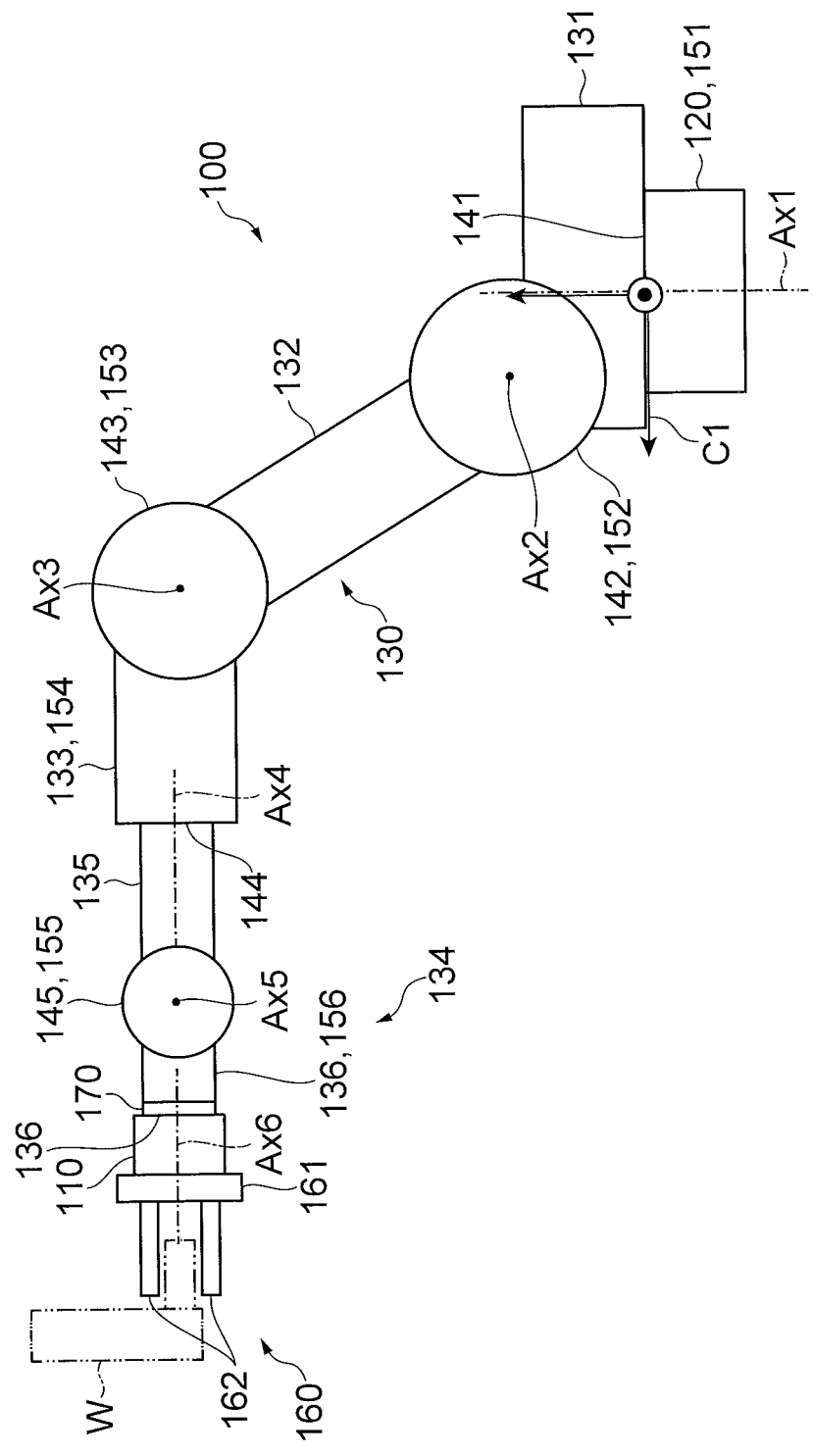
FIG. 2 is a schematic illustrating an example configuration of a vertical multi-articular robot.

As described in FIG. 2, the robot 100 is a six-axis vertical multi-articular robot, and includes a leading end 110, a base 120, and a multi-articular arm 130. The multi-articular arm 130 changes the position and the posture of the leading end 110 relative to the base 120. The base 120 is mounted or placed on a floor surface of a workspace of the robot 100. It is to be noted that the base 120 may be mounted or placed on a movable device such as a dolly and a carriage. The multi-articular arm 130 connects the base 120 and the leading end 110 to each other, and changes the position and the posture of the leading end 110 in a first coordinate system C1 (robot coordinate system). The robot coordinate system is a coordinate system that serves as a basis for the control of the robot 100. For example, the robot coordinate system is fixed to the base 120.

The multi-articular arm 130 includes a turnable portion 131, a first arm 132, a second arm 133, a wrist 134, and actuators 151, 152, 153, 154, 155, and 156. The turnable portion 131 is mounted on an upper portion of the base 120 turnably about a vertical axis Ax1. Specifically, the multi-articular arm 130 includes a joint 141. The joint 141 makes the turnable portion 131 turnable about the axis Ax1.

The first arm 132 is connected to the turnable portion 131 swingably about axis Ax2, which crosses (for example, orthogonal to) the axis Ax1. Specifically, the multi-articular arm 130 includes a joint 142. The joint 142 makes the first arm 132 swingable about the axis Ax2. It is to be noted that when axes "cross" each other, this means that the axes may be skew axes, as if the axes are aligned in "grade separation" arrangement. The same applies in the following description.

The second arm 133 is connected to an end of the first arm 132 swingably about axis Ax3, which crosses the Ax1. Specifically, the multi-articular arm 130 includes a joint 143. The joint 143 makes the second arm 133 swingable about the axis Ax3. The axis Ax3 may be parallel to Ax2.

The wrist 134 includes a turnable arm 135 and a swingable arm 136. The turnable arm 135 extends from an end of the second arm 133 along the axial center of the second arm 133, and is turnable about axis Ax4, which is along the axial center of the second arm 133. Specifically, the multi-articular arm 130 includes a joint 144. The joint 144 makes the turnable arm 135 turnable about the axis Ax4.

The swingable arm 136 is connected to an end of the turnable arm 135 swingably about axis Ax5, which crosses (for example, orthogonal to) the axis Ax4. Specifically, the multi-articular arm 130 includes a joint 145. The joint 145 makes the swingable arm 136 swingable about the axis Ax5.

The leading end 110 is connected to an end of the swingable arm 136 tunably about axis Ax6, which is along the axial center of the swingable arm 136. Specifically, the multi-articular arm 130 includes a joint 146. The joint 146 makes the leading end 110 turnable about the axis Ax6.

The actuators 151, 152, 153, 154, 155, and 156 are driven by electric motors to respectively drive a plurality of joints 141, 142, 143, 144, 145, and 146 of the multi-articular arm 130. For example, the actuator 151 causes the turnable portion 131 to turn about the axis Ax1; the actuator 152 causes the first arm 132 to swing about the axis Ax2; the actuator 153 causes the second arm 133 to swing about the axis Ax3; the actuator 154 causes the turnable arm 135 to turn about the axis Ax4; the actuator 155 causes the swingable arm 136 to swing about the axis Ax5; and the actuator 156 causes the leading end 110 to turn about the axis Ax6. That is, the actuator 151 to 156 respectively drive the joints 141 to 146.

A hand 160 is attached to the leading end 110. The hand 160 is a tool to hold a holding target such as the workpiece W. The hand 160 includes a body 161 and a plurality of fingers 162. The plurality of fingers 162 are connected to the body 161 and capable of surrounding (or sandwiching) the area in which the holding target is disposed. The body 161 is attached to the leading end 110 and includes, for example, an electric motor as a driving source to drive the plurality of fingers 162. The body 161 moves the plurality of fingers 162 toward each other to hold the holding target, and moves the plurality of fingers 162 away from each other to release the holding target.

The hand 160 is attached to the leading end 110 via a force sensor 170. The force sensor 170 detects a force acting on the hand 160. Specifically, the force sensor 170 is a six-axis force sensor that detects six kinds of force, namely, forces along three axes orthogonal to each other and torques around the three axes.

It is to be noted that the above-described configuration of the robot 100 has been presented for example purposes only; the robot 100 may have any other configuration insofar as the multi-articular arm 130 changes the position and the posture of the leading end 110 relative to the base 120. For example, the robot 100 may be a seven-axis robot, with a redundant axis added to the above-described six-axis vertical multi-articular robot.

Motion Teaching Apparatus

Referring again to FIG. 1, the motion teaching apparatus 3 includes a demonstration device 30 and a teaching computer 400. The demonstration device 30 includes a demonstration tool 31 and a teaching motion detection device 32. The demonstration tool 31 is a tool for a demonstration to teach a motion to the robot 100. Specifically, the demonstration tool 31 is attached to a worked-on object to be worked on by the teaching target so that the demonstration tool 31 moves together with the worked-on object to serve as a measurement target as to position and posture.

The teaching motion detection device 32 detects the position and the posture of the demonstration tool 31 in a second coordinate system C2. The second coordinate system C2 is different from the first coordinate system C1. The teaching motion detection device 32 includes a passive multi-articular arm 330 and a sensor. The passive multi-articular arm 330 is connected to the demonstration tool 31 and operates based on the position and the posture of the demonstration tool 31. The sensor detects the posture of the multi-articular arm 330. It is to be noted that the teaching motion detection device 32 may have any other configuration insofar as the teaching motion detection device 32 is capable of detecting the position and the posture of the demonstration tool 31 in the second coordinate system C2. For example, the teaching motion detection device 32 may detect the position and the posture of the demonstration tool 31 in a non-contact manner based on image information.

The teaching computer 400 obtains, from the demonstration device 30, data of a motion specified by the demonstration, and generates a motion command for the robot 100 based on the data that has been obtained. A configuration of the demonstration device 30, which is armed as described above, will be described in detail below, as an example of contact detection of the position and the posture of the demonstration tool 31.

Figure 3:
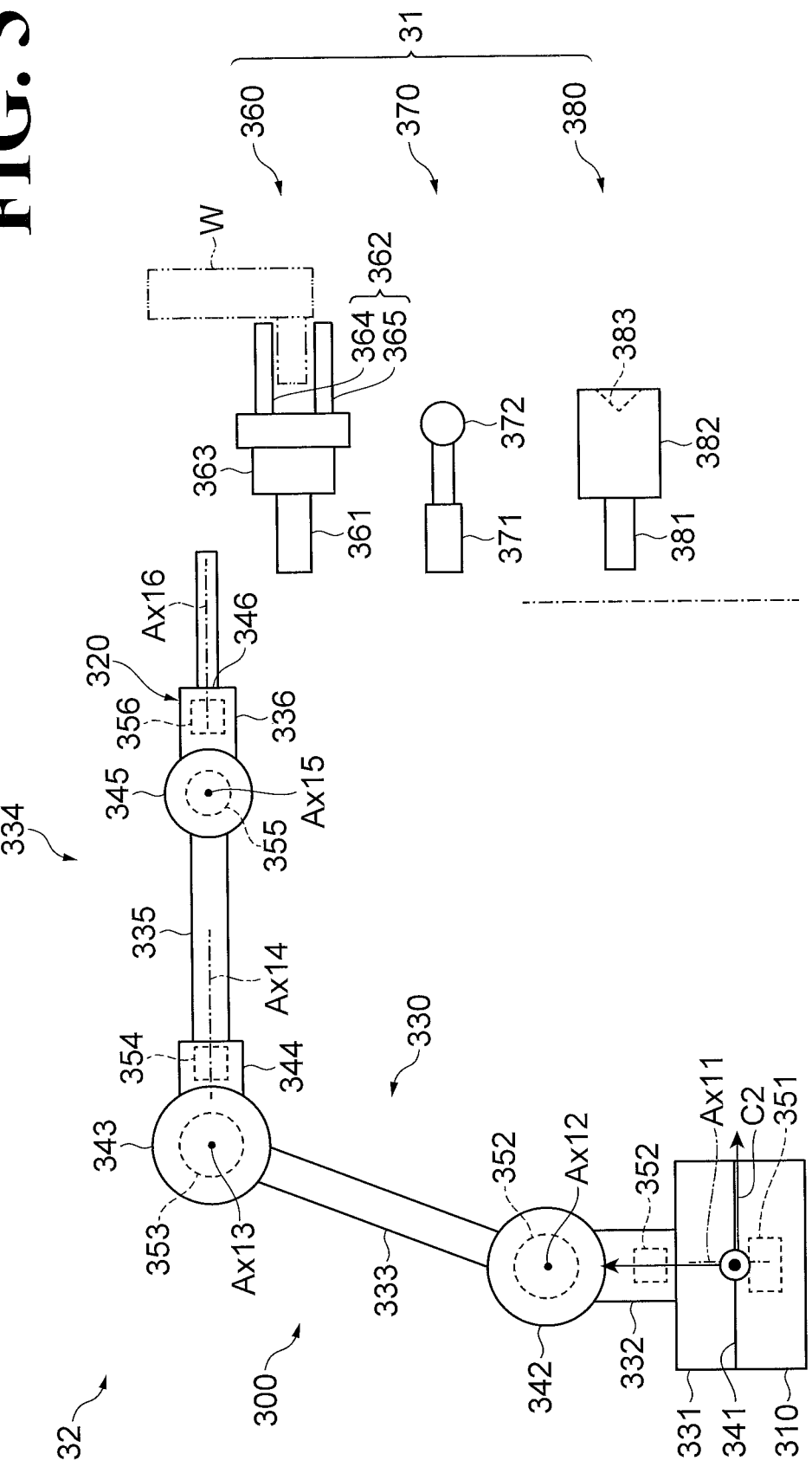
FIG. 3 is a schematic illustrating an example configuration of a demonstration device.

As illustrated in FIG. 3, the demonstration device 30 includes a digitizer 300, a demonstration tool 360, a spherical tool 370, and a sphere receiving tool 380. The digitizer 300 includes a base 310, a leading end 320, and the multi-articular arm 330. The base 310 is mounted or placed on a floor surface of the workspace of the robot 100. It is to be noted that the base 310 may be mounted or placed on a movable device such as a dolly and a carriage.

The multi-articular arm 330 is a non-limiting example of the multi-articular arm. The multi-articular arm 330 connects the base 310 and the leading end 320 to each other and operates based on the position and the posture of the leading end 320 in the second coordinate system C2 (demonstration coordinate system). The demonstration coordinate system is a preset coordinate system that serves as a basis for the detection of the position and the posture of the demonstration tool 31. For example, the demonstration coordinate system is fixed to the base 310.

The multi-articular arm 330 includes a turnable portion 331, a first arm 332, a second arm 333, a wrist 334, and the angle sensors 351, 352, 353, 354, 355, and 356.

The turnable portion 331 is mounted on an upper portion of the base 310 turnably about vertical axis Ax11. Specifically, the multi-articular arm 330 includes a joint 341. The joint 341 makes the turnable portion 331 turnable about the axis Ax1.

The first arm 332 is connected to the turnable portion 331 swingably about axis Ax12, which crosses (for example, orthogonal to) the axis Ax11. Specifically, the multi-articular arm 330 includes a joint 342. The joint 342 makes the first arm 332 swingable about the axis Ax12.

The second arm 333 is connected to an end of the first arm 332 swingably about axis Ax13, which crosses the axis Ax11. Specifically, the multi-articular arm 330 includes a joint 343. The joint 343 makes the second arm 333 swingable about the axis Ax13. The axis Ax13 may be parallel to the Ax12.

The wrist 334 includes a turnable arm 335 and a swingable arm 336. The turnable arm 335 extends from an end of the second arm 333 along the axial center of the second arm 333, and is turnable about axis Ax14, which is along the axial center of the second arm 333. Specifically, the multi-articular arm 330 includes a joint 344. The joint 344 makes the turnable arm 335 turnable about the axis Ax14.

The swingable arm 336 is connected to an end of the turnable arm 335 swingably about axis Ax15, which crosses (for example, orthogonal to) the axis Ax14. Specifically, the multi-articular arm 330 includes a joint 345. The joint 345 makes the swingable arm 336 swingable about the axis Ax5.

The leading end 320 is connected to an end of the swingable arm 336 turnably about axis Ax16, which is along the axial center of the swingable arm 336. Specifically, the multi-articular arm 330 includes a joint 346. The joint 346 makes the leading end 320 turnable about the axis Ax16.

The angle sensors 351, 352, 353, 354, 355, and 356 are non-limiting examples of the sensor. Examples of the angle sensors 351, 352, 353, 354, 355, and 356 include, but are not limited to, rotary encoders and potentiometers. The angle sensor 351 detects a motion angle of a joint 341 of the multi-articular arm 330, the angle sensor 352 detects a motion angle of a joint 342 of the multi-articular arm 330, the angle sensor 353 detects a motion angle of a joint 343 of the multi-articular arm 330, the angle sensor 354 detects a motion angle of a joint 344 of the multi-articular arm 330, the angle sensor 355 detects a motion angle of a joint 345 of the multi-articular arm 330, and the angle sensor 356 detects a motion angle of a joint 346 of the multi-articular arm 330. Specifically, the angle sensor 351 detects the turning angle of the turnable portion 131 about the axis Ax11, the angle sensor 352 detects the swinging angle of the first arm 332 about the axis Ax12, the angle sensor 353 detects the swinging angle of the second arm 333 about the axis Ax13, the angle sensor 354 detects the turning angle of the turnable arm 335 about the axis Ax14, the angle sensor 355 detects the swinging angle of the swingable arm 336 about the axis Ax15, and the angle sensor 356 detects the turning angle of the leading end 320 about the axis Ax16.

The demonstration tool 360, the spherical tool 370, and the sphere receiving tool 380 are tools attachable and detachable to and from the leading end 320. In this configuration, the demonstration tool 31 includes the leading end 320, the demonstration tool 360, the spherical tool 370, and the sphere receiving tool 380.

The demonstration tool 360 is a tool for hold a holding target, such as a workpiece W. The demonstration tool 360 includes an attachable-detachable 361, a hand 362, and a force sensor 363. The attachable-detachable 361 is attachable and detachable to and from the leading end 320. The hand 362 is a portion for holding the holding target. The hand 362 includes a body 364 and a plurality of fingers 365. The plurality of fingers 365 are connected to the body 364 and capable of surrounding (or sandwiching) the area in which the holding target is disposed. The body 364 moves the plurality of fingers 365 based on, for example, a manual operation made by a worker. The body 364 moves the plurality of fingers 365 toward each other to hold the holding target, and moves the plurality of fingers 365 away from each other to release the holding target.

The hand 362 is attached to the attachable-detachable 361 via the force sensor 363. The force sensor 363 detects a force acting on the demonstration tool 31; for example, a force acting on the hand 362. Specifically, the force sensor 363 is a six-axis force sensor that detects six kinds of force, namely, forces along three axes orthogonal to each other and torques around the three axes.

The spherical tool 370 is a tool for providing the demonstration tool 31 with a first tool indication device. The spherical tool 370 includes an attachable-detachable portion 371 and a spherical chip 372. The attachable-detachable portion 371 is attachable and detachable to and from the leading end 320. The spherical chip 372 has a spherical outer shape and is fixed to the attachable-detachable portion 371. With the attachable-detachable portion 371 attached to the leading end 320, the spherical chip 372 serves as the first tool indication device of the demonstration tool 31.

The sphere receiving tool 380 is a tool for providing the demonstration tool 31 with a second tool indication device. The sphere receiving tool 380 includes a holdable portion 381 and a sphere receiving portion 382. The holdable portion 381 is a portion holdable by the hand 362. The sphere receiving portion 382 is fixed to the holdable portion 381. With the holdable portion 381 held by the hand 362, the sphere receiving tool 380 is attached to the leading end 320 via the demonstration tool 360. With the sphere receiving tool 380 attached to the leading end 320, the sphere receiving portion 382 serves as the second tool indication device of the demonstration tool 31.

A depression 383 is formed on an end surface of the sphere receiving portion 382. The depression 383 is engageable with the spherical chip 372; that is, the spherical chip 372 is engageable with the sphere receiving portion 382. The spherical chip 372 may be attractable to the sphere receiving portion 382. For example, the sphere receiving portion 382 includes a permanent magnet, and the spherical chip 372 includes a soft magnetic material such as iron. It is also possible that the spherical chip 372 includes a permanent magnet, and that the spherical chip 372 includes a soft magnetic material such as iron. It is also possible that both the spherical chip 372 and the sphere receiving portion 382 include a permanent magnet.

It is to be noted that with the holdable portion 381 held by the hand 160, the sphere receiving tool 380 is also attached to the leading end 110 via the hand 160. With the sphere receiving tool 380 attached to the leading end 110, the sphere receiving portion 382 serves as a robot indication device provided in or on the robot 100. It is to be noted that the robot indication device may not necessarily be implemented by the sphere receiving tool 380. Another possible example is that the robot indication device is provided on part of the outer surface of the robot 100 (for example, part of the outer surface of the leading end 110).

Teaching Computer

A configuration of the teaching computer 400 will be described in detail. The teaching computer 400 executes: obtaining reference information including information indicating the position and the posture of the demonstration tool 31 detected by the teaching motion detection device 32 with the tool indication device of the demonstration tool 31 located at a plurality of positions in the first coordinate system C1; based on the reference information, deriving coordinate system relationship information indicating a relationship between the first coordinate system C1 and the second coordinate system C2; obtaining demonstration motion information including information indicating a transition of the position and the posture detected by the teaching motion detection device 32 during the demonstration using the demonstration tool 31; and based on the demonstration motion information and the coordinate system relationship information, generating a motion command for the leading end 320.

Figure 4:
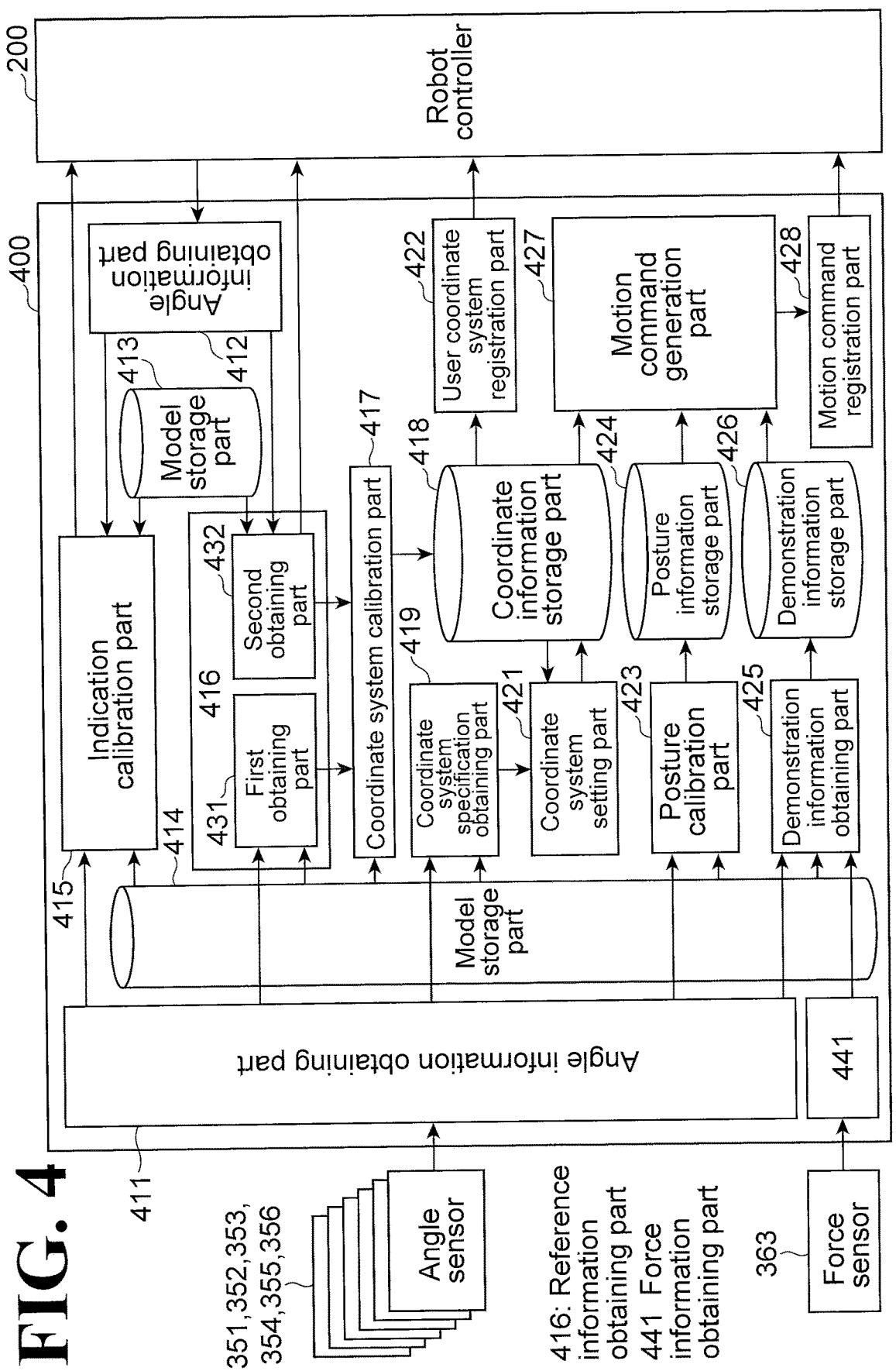
FIG. 4 is a block diagram illustrating an example functional configuration of a teaching computer.

As illustrated in FIG. 4, the teaching computer 400 includes functional configurations (hereinafter referred to as "functional modules"), namely, an angle information obtaining part 411, an angle information obtaining part 412, a model storage part 413, a model storage part 414, a reference information obtaining part 416, a coordinate system calibration part 417, a coordinate information storage part 418, a demonstration information obtaining part 425, a demonstration information storage part 426, a motion command generation part 427, a motion command registration part 428, and a force information obtaining part 441.

From the angle sensors 351, 352, 353, 354, 355, and 356, the angle information obtaining part 411 obtains information indicating the motion angles of the joints 341, 342, 343, 344, 345, and 346 of the multi-articular arm 330. From the robot 100, the angle information obtaining part 412 obtains information indicating the motion angles of the joints 141, 142, 143, 144, 145, and 146 of the multi-articular arm 130.

The model storage part 413 stores model information of the demonstration device 30. A non-limiting example of the model information is link length information, which indicates link lengths under the assumption that the structure of the demonstration device 30 is represented using a plurality of links and a plurality of nodes. The model information of the demonstration device 30 includes model information with the demonstration tool 360 attached to the leading end 320, model information with the spherical tool 370 attached to the leading end 320, and model information with the sphere receiving tool 380 attached to the leading end 320.

The model storage part 414 stores model information of the robot 100. A non-limiting example of the model information of the robot 100 is link length information, which indicates link lengths under the assumption that the structure of the robot 100 is represented using a plurality of links and a plurality of nodes.

The force information obtaining part 441 obtains, from the force sensor 363, information indicating a force acting on the demonstration tool 31. The reference information obtaining part 416 obtains reference information including information indicating the position and the posture of the demonstration tool 31 detected by the teaching motion detection device 32 with the tool indication device of the demonstration tool 31 located at a plurality of positions in the first coordinate system C1. A non-limiting example of the tool indication device of the demonstration tool 31 is the spherical chip 372 with the spherical tool 370 attached to the leading end 320.

More meticulously segmented functional modules of the reference information obtaining part 416 include a first obtaining part 431 and a second obtaining part 432. Based on postures of the robot 100 respectively corresponding to a plurality of reference information obtaining spots at which the robot indication device of the robot 100 is located, the first obtaining part 431 derives information indicating the positions of the plurality of reference information obtaining spots in the first coordinate system C1. A non-limiting example of the robot indication device of the robot 100 is the sphere receiving portion 382 with the sphere receiving tool 380 attached to the leading end 110. Specifically, with the sphere receiving portion 382 of the sphere receiving tool 380 being attached to the leading end 110 and being located at a plurality of reference information obtaining spots, the first obtaining part 431 performs a direct kinematics operation based on: angle information indicating the angles of the joints 141, 142, 143, 144, 145, and 146 obtained by the angle information obtaining part 412; and the model information of the robot 100 stored in the model storage part 414. By performing the direct kinematics operation, the first obtaining part 431 derives position information indicating the position of the sphere receiving portion 382 in the first coordinate system C1.

The second obtaining part 432 obtains information indicating the positions and the postures of the demonstration tool 31 detected by the teaching motion detection device 32 with the tool indication device in contact with the robot indication device located at the plurality of reference information obtaining spots. Specifically, the second obtaining part 432 obtains, from the angle information obtaining part 411, angle information indicating the angles of the joints 341, 342, 343, 344, 345, and 346 with the spherical chip 372 (the spherical chip 372 of the spherical tool 370 attached to the leading end 320) engaged with the depression 383 of the sphere receiving portion 382 (the sphere receiving portion 382 of the sphere receiving tool 380 attached to the leading end 110) located at the plurality of reference information obtaining spots.

Based on the reference information, the coordinate system calibration part 417 derives coordinate system relationship information indicating a relationship between the first coordinate system C1 and the second coordinate system C2. The coordinate system relationship information includes: inter-coordinate system offset information indicating an offset between the origin of the first coordinate system C1 and the origin of the second coordinate system C2; and inter-coordinate system angle information indicating a difference in posture between the first coordinate system C1 and the second coordinate system C2. Specifically, the coordinate system calibration part 417 performs a direct kinematics operation based on: the information obtained by the second obtaining part 432; and the model information of the demonstration device 30 stored in the model storage part 413. By performing the direct kinematics operation, the coordinate system calibration part 417 derives the positions of the plurality of reference information obtaining spots in the second coordinate system C2. Thus, position information in the first coordinate system C1 (hereinafter referred to as "first position information") and position information in the second coordinate system C2 (hereinafter referred to as "second position information") are obtained for each of the plurality of reference information obtaining spots.

The first position information and the second position information are correlated with each other via the inter-coordinate system offset information and the inter-coordinate system angle information. In light of the circumstances, the coordinate system calibration part 417 derives a correlation between the first position information of the plurality of reference information obtaining spots and the second position information of the plurality of reference information obtaining spots, and regards the correlation as the inter-coordinate system offset information and the inter-coordinate system angle information. It is to be noted that the number of the reference information obtaining spots may be equal to or more than a number that suffices to make derivable all the variables included in the inter-coordinate system offset information and the inter-coordinate system angle information.

The coordinate information storage part 418 stores the coordinate system relationship information derived by the coordinate system calibration part 417.

The demonstration information obtaining part 425 obtains demonstration motion information including information indicating a transition of the position and the posture of the demonstration tool 31 detected by the teaching motion detection device 32 during the demonstration using the demonstration tool 31. A non-limiting example of the demonstration using the demonstration tool 31 is the work of holding a demonstration target via the demonstration tool 31 and moving the demonstration tool 31, thereby teaching the robot 100 to perform a motion with the leading end 110 holding a worked-on object. Specifically, a worker in charge of the motion teaching attaches the demonstration tool 360 to the leading end 320 and causes the hand 362 of the demonstration tool 360 to hold a demonstration target (for example, workpiece W). Then, the worker performs a demonstration by holding the attachable-detachable 361. The demonstration motion information obtained by the demonstration information obtaining part 425 may further include information indicating a transition of a force acting on the demonstration tool 31 during the demonstration (this information will be hereinafter referred to as "force information during the demonstration"). The force acting on the demonstration tool 31 during the demonstration is detected by the force sensor 363.

Specifically, the demonstration information obtaining part 425 performs a direct kinematics operation based on: the angle information indicating the angles of the joints 341, 342, 343, 344, 345, and 346 obtained by the angle information obtaining part 411 during the demonstration; and the model information of the demonstration device 30 stored in the model storage part 413. By performing the direct kinematics operation, the demonstration information obtaining part 425 derives information indicating the position and the posture of the demonstration tool 31 during the demonstration. Also, the demonstration information obtaining part 425 obtains, as the force information during the demonstration, information indicating a transition of the forces that the force information obtaining part 441 obtains from the force sensor 363 during the demonstration.

The demonstration information storage part 426 stores the demonstration motion information obtained by the demonstration information obtaining part 425. The motion command generation part 427 generates a motion command for the leading end 110 based on: the demonstration motion information stored in the demonstration information storage part 426; and the coordinate system relationship information stored in the coordinate information storage part 418. Specifically, the motion command generation part 427 performs a coordinate system conversion from the second coordinate system C2 to the first coordinate system C1 based on the coordinate system relationship information stored in the coordinate information storage part 418. In this manner, the motion command generation part 427 generates a motion command for the leading end 110 in the first coordinate system C1. More specifically, the motion command generation part 427 generates a motion command for the leading end 110 in the first coordinate system C1 by subjecting the demonstration motion information to: rotational transformation processing (for example, rotational transformation matrix multiplication) based on the inter-coordinate system angle information included in the coordinate system relationship information; and offset processing (for example, offset vector addition) based on the inter-coordinate system offset information.

The motion command for the leading end 110 may include a force command indicating a desired transition of a force acting on the leading end 110 during the motion made according to the motion command. Specifically, the motion command generation part 427 derives a force command by subjecting the force information during the demonstration to a coordinate system conversion from the second coordinate system C2 to the first coordinate system C1 based on the coordinate system relationship information.

It is to be noted that the motion command for the leading end 110 in the first coordinate system C1 may be any form of information insofar as a transition(s) of the position and the posture of the leading end 110 in the first coordinate system C1 can be identified. For example, the motion command for the leading end 110 may be information directly indicating the position and the posture of the leading end 110 in the first coordinate system C1, or may be information indirectly indicating the position and the posture of the leading end 110 in the first coordinate system C1.

A non-limiting example of the information directly indicating the position and the posture of the leading end 110 in the first coordinate system C1 includes: information indicating a transition of the position of the leading end 110 using a value on each coordinate axis of the first coordinate system C1; and information indicating a transition of the posture of the leading end 110 using an angle around each coordinate axis of the first coordinate system C1. A non-limiting example of information indirectly indicating the position and the posture of the leading end 110 in the first coordinate system C1 is information indicating the position and the posture of the leading end 110 in a coordinate system that is different from the first coordinate system C1 but has a known relationship with the first coordinate system C1.

The motion command registration part 428 transmits, to the robot controller 200, the motion command for the leading end 110 generated by the motion command generation part 427.

The teaching computer 400 may further include an indication calibration part 415, in addition to the above-described functional modules. The indication calibration part 415 derives indication position information indicating the position of the tool indication device on the demonstration tool 31. Specifically, with the spherical tool 370 attached to the leading end 320, the indication calibration part 415 derives first indication position information indicating the position of the spherical chip 372 on the demonstration tool 31. A non-limiting example of example the information indicating the position of the spherical chip 372 is information indicating the position of the spherical chip 372 in a coordinate system fixed to the leading end 320.

Specifically, the indication calibration part 415 derives the first indication position information based on a plurality of positions and postures of the demonstration tool 31 detected by the teaching motion detection device 32 with the position of the spherical chip 372 in fixed state. More specifically, the demonstration tool 31 is caused to take a plurality of indication information obtaining postures with the position of the spherical chip 372 constant. With the demonstration tool 31 in this state, the indication calibration part 415 obtains the angle information indicating the angles of the joints 341, 342, 343, 344, 345, and 346 respectively detected by the angle sensors 351, 352, 353, 354, 355, and 356. The indication calibration part 415 derives the first indication position information while ensuring that the position of the spherical chip 372 in the second coordinate system C2 remains constant at any of the plurality of indication information obtaining postures, when the position of the spherical chip 372 has been derived based on: the angle information indicating the angles of the joints 341, 342, 343, 344, 345, and 346; the model information of the demonstration device 30 stored in the model storage part 413; and the first indication position information. The number of the indication information obtaining postures may be equal to or more than a number that suffices to make derivable all the variables included in the first indication position information. The indication calibration part 415 regards the first indication position information that has been derived as model information of the demonstration device 30 with the spherical tool 370 attached to the leading end 320, and registers the model information in the model storage part 413.

The indication calibration part 415 may further derive, with the sphere receiving tool 380 attached to the leading end 320, second indication position information indicating the position of the sphere receiving portion 382 relative to the demonstration tool 31. A non-limiting example of the information indicating the position of the sphere receiving portion 382 is position information indicating the position of the depression 383 of the sphere receiving portion 382 in a coordinate system fixed to the leading end 320.

Specifically, the indication calibration part 415 derives the second indication position information based on a plurality of positions and postures of the demonstration tool 31 detected by the teaching motion detection device 32 with the position of the sphere receiving portion 382 fixed. More specifically, the demonstration tool 31 is caused to take a plurality of indication information obtaining postures with the position of the sphere receiving portion 382 constant. With the demonstration tool 31 in this state, the indication calibration part 415 obtains the angle information indicating the angles of the joints 341, 342, 343, 344, 345, and 346 respectively detected by the angle sensors 351, 352, 353, 354, 355, and 356. The indication calibration part 415 derives the second indication position information while ensuring that the position of the depression 383 remains constant at any of the plurality of indication information obtaining postures, when the position of the depression 383 has been derived based on: the angle information indicating the angles of the joints 341, 342, 343, 344, 345, and 346; the model information of the demonstration device 30 stored in the model storage part 413; and the second indication position information. The number of the measurement target posture may be equal to or more than a number that suffices to make derivable all the variables included in the second indication position information. The indication calibration part 415 regards the second indication position information that has been derived as model information of the demonstration device 30 with the sphere receiving tool 380 attached to the leading end 320, and registers the model information in the model storage part 413.

The indication calibration part 415 may further derive, with the sphere receiving tool 380 attached to the leading end 110 of the robot 100, third indication position information indicating the position of the sphere receiving portion 382 relative to the leading end 110. A non-limiting example of the information indicating the position of the sphere receiving portion 382 is position information indicating the position of the depression 383 of the sphere receiving portion 382 in a coordinate system fixed to the leading end 110.

Specifically, the indication calibration part 415 derives the third indication position information based on a displacement of the depression 383 that is based on a change in the posture of the leading end 110 of the robot 100. The indication calibration part 415 regards the third indication position information that has been derived as model information of the robot 100 with the sphere receiving tool 380 attached to the leading end 110, and registers the model information in the model storage part 414.

The indication calibration part 415 may obtain the information indicating the displacement of the depression 383 from the teaching motion detection device 32. Specifically, the spherical chip 372 of the spherical tool 370 attached to the leading end 320 is brought into engagement with the depression 383. With the spherical chip 372 in this state, the indication calibration part 415 obtains the angle information indicating the angles of the joints 341, 342, 343, 344, 345, and 346 respectively detected by the angle sensors 351, 352, 353, 354, 355, and 356. Then, the indication calibration part 415 derives the displacement of the spherical chip 372 based on the angle information and the model information of the demonstration device 30 stored in the model storage part 413.

In the configuration in which the teaching computer 400 includes the indication calibration part 415, the coordinate system calibration part 417 derives the coordinate system relationship information based on: the reference information obtained by the reference information obtaining part 416; and the indication position information derived by the indication calibration part 415.

The teaching computer 400 may further include a posture calibration part 423 and a posture information storage part 424. When a demonstration with the demonstration tool 31 holding a demonstration target (for example, workpiece W) is performed to teach the robot 100 to make a motion with the leading end 110 holding a worked-on object (for example, workpiece W), the posture calibration part 423 derives posture information indicating the holding posture in which the demonstration target is to be held by the demonstration tool 31. The posture calibration part 423 derives the posture information based on a position and a posture of the demonstration tool 31 respectively corresponding to a predetermined position and a predetermined posture at which the demonstration target is to be located. The posture calibration part 423 may derive the posture information solely based on the posture of the demonstration tool.

Specifically, with the demonstration tool 360 being attached to the leading end 320 and holding the workpiece W, and with the workpiece W taking the predetermined position and the predetermined posture, the posture calibration part 423 obtains the angle information indicating the angles of the joints 341, 342, 343, 344, 345, and 346 respectively detected by the angle sensors 351, 352, 353, 354, 355, and 356. Then, based on the angle information and the model information stored in the model storage part 413, the posture calibration part 423 derives the information indicating the position and the posture of the demonstration tool 360. The work of locating the workpiece W at the predetermined position and the predetermined posture is performed by adjusting the position and the posture of the workpiece W to the position and the posture of a positioning jig located in advance at a predetermined position. Based on the position and the posture at which the workpiece W is located and based on the position and the posture of the demonstration tool 360 that have been derived, the posture calibration part 423 derives the holding posture in which the workpiece W is to be held by the demonstration tool 360.

The posture information storage part 424 stores the posture information derived by the posture calibration part 423.

In the configuration in which the teaching computer 400 further includes the posture calibration part 423 and the posture information storage part 424, the motion command generation part 427 generates the motion command for the leading end 110 based on: the demonstration motion information stored in the demonstration information storage part 426; the coordinate system relationship information stored in the coordinate information storage part 418; and the posture information stored in the posture information storage part 424.

The teaching computer 400 may further include a coordinate system specification obtaining part 419, a coordinate system setting part 421, and a user coordinate system registration part 422. The coordinate system specification obtaining part 419 obtains coordinate system specifying information. The coordinate system specifying information includes information indicating the position and the posture of the demonstration tool 31 detected by the teaching motion detection device 32 with the tool indication device located at a plurality of coordinate system specified spots. Specifically, when the spherical chip 372 of the spherical tool 370 attached to the leading end 320 has been located at the plurality of coordinate system specified spots, the coordinate system specification obtaining part 419 obtains the angle information indicating the angles of the joints 341, 342, 343, 344, 345, and 346 respectively detected by the angle sensors 351, 352, 353, 354, 355, and 356. The plurality of coordinate system specified spots are specified as positions on any coordinate axis of a setting target coordinate system.

Based on the coordinate system specifying information obtained by the coordinate system specification obtaining part 419, the coordinate system setting part 421 sets a third coordinate system (user coordinate system) different from the first coordinate system C1 and the second coordinate system C2. Specifically, based on the angle information indicating the angles of the joints 341, 342, 343, 344, 345, and 346 and based on the model information stored in the model storage part 413, the coordinate system setting part 421 derives the positions of the plurality of coordinate system specified spots in the second coordinate system C2. Then, based on the positions that have been derived, the coordinate system setting part 421 derives definition information of the third coordinate system (information defining the third coordinate system) as in the second coordinate system C2. The definition information of the third coordinate system includes: position information indicating the position of the origin of the third coordinate system; and information indicating direction vectors of the coordinate axes of the third coordinate system. The coordinate system setting part 421 registers the definition information of the third coordinate system in the coordinate information storage part 418.

The user coordinate system registration part 422 transmits, to the robot controller 200, the definition information of the third coordinate system stored in the coordinate information storage part 418. Based on the coordinate system relationship information stored in the coordinate information storage part 418, the user coordinate system registration part 422 may convert the definition information of the third coordinate system in the second coordinate system C2 into definition information of the third coordinate system in the first coordinate system C1, and transmit the converted definition information to the robot controller 200.

Robot Controller

Figure 5:
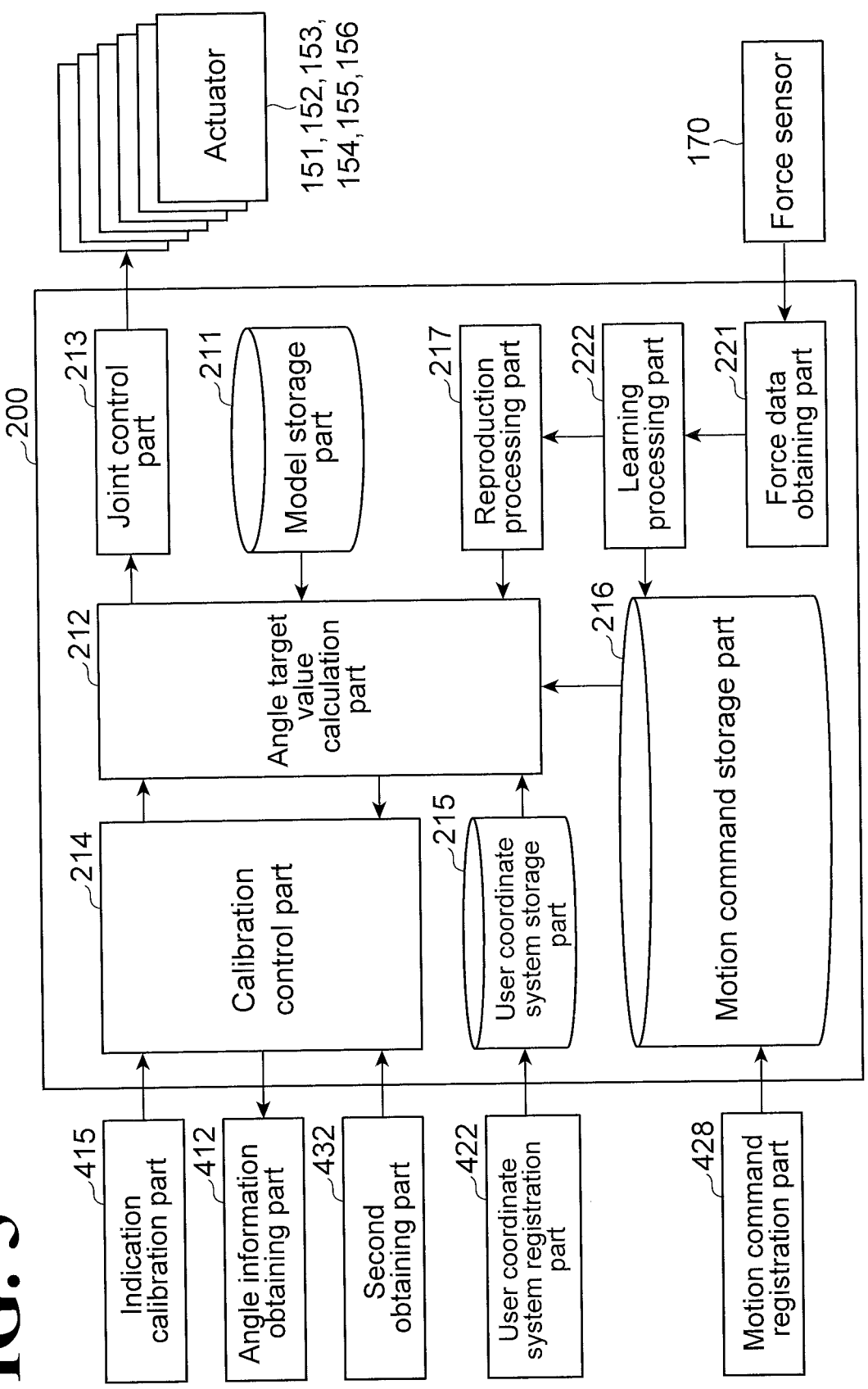
FIG. 5 is a block diagram illustrating an example functional configuration of a robot controller.

As illustrated in FIG. 5, the robot controller 200 includes functional modules, namely, a model storage part 211, an angle target value calculation part 212, a joint control part 213, a calibration control part 214, a user coordinate system storage part 215, a motion command storage part 216, a reproduction processing part 217, a force data obtaining part 221, and a learning processing part 222.

The model storage part 211 stores model information of the robot 100 that is similar to the information stored in the model storage part 414. The angle target value calculation part 212 performs an inverse kinematics operation based on: the target position and the target posture of the leading end 110; and the model information of the robot 100 stored in the model storage part 414. By performing the inverse kinematics operation, the angle target value calculation part 212 derives target values of the motion angles of the joints 141, 142, 143, 144, 145, and 146 (hereinafter referred to as "angle target value").

The joint control part 213 controls the actuators 151, 152, 153, 154, 155, and 156 to make the motion angles of the joints 141, 142, 143, 144, 145, and 146 follow the angle target values derived by the angle target value calculation part 212.

At the time when the reference information obtaining part 416 obtains the reference information, the calibration control part 214 controls the robot 100 such that the depression 383 of the sphere receiving tool 380 attached to the leading end 110 are located at a plurality of reference information obtaining spots. Specifically, the calibration control part 214 outputs, to the angle target value calculation part 212, a target position and a target posture of the leading end 110 that correspond to the plurality of reference information obtaining spots at which the depression 383 is to be located. At the time when the indication calibration part 415 derives the indication position information, the calibration control part 214 may control the robot 100 to change the posture of the leading end 110. Specifically, the calibration control part 214 outputs, to the angle target value calculation part 212, a target position and a target posture of the leading end 110 that correspond to a to-be-changed posture of the leading end 110.

The user coordinate system storage part 215 stores the definition information of the third coordinate system transmitted from the user coordinate system registration part 422. The motion command storage part 216 stores the motion command for the leading end 110 transmitted from the motion command registration part 428.

The reproduction processing part 217 controls the robot 100 to operate based on the motion command for the leading end 110 stored in the motion command storage part 216. Specifically, the reproduction processing part 217 performs processing of outputting, sequentially to the angle target value calculation part 212, the target position and the target posture of the leading end 110 included in the motion command for the leading end 110 stored in the motion command storage part 216 (this processing will be hereinafter referred to as "reproduction processing").

The force data obtaining part 221 obtains information indicating a transition of the force detected by the force sensor 170 when the robot 100 operates based on the motion command for the leading end 110 stored in the motion command storage part 216 (this information will be hereinafter referred to as "force information during the reproduction").

The learning processing part 222 corrects the target position and the target posture of the leading end 110 included in the motion command for the leading end 110 so that the force information during the reproduction obtained by the force data obtaining part 221 is made as close as possible to the force command. Specifically, in order to make the force information during the reproduction as close as possible to the force command, the learning processing part 222 repeats: causing the reproduction processing part 217 to perform the reproduction processing; obtaining the force information during the reproduction from the force data obtaining part 221; and making a minor adjustment to the motion command for the leading end 110 stored in the motion command storage part 216, until the difference between the force information during the reproduction and the force command falls within a tolerable range. The tolerable range is set in advance.

Hardware Configurations of Teaching Computer and Robot Controller

Figure 6:
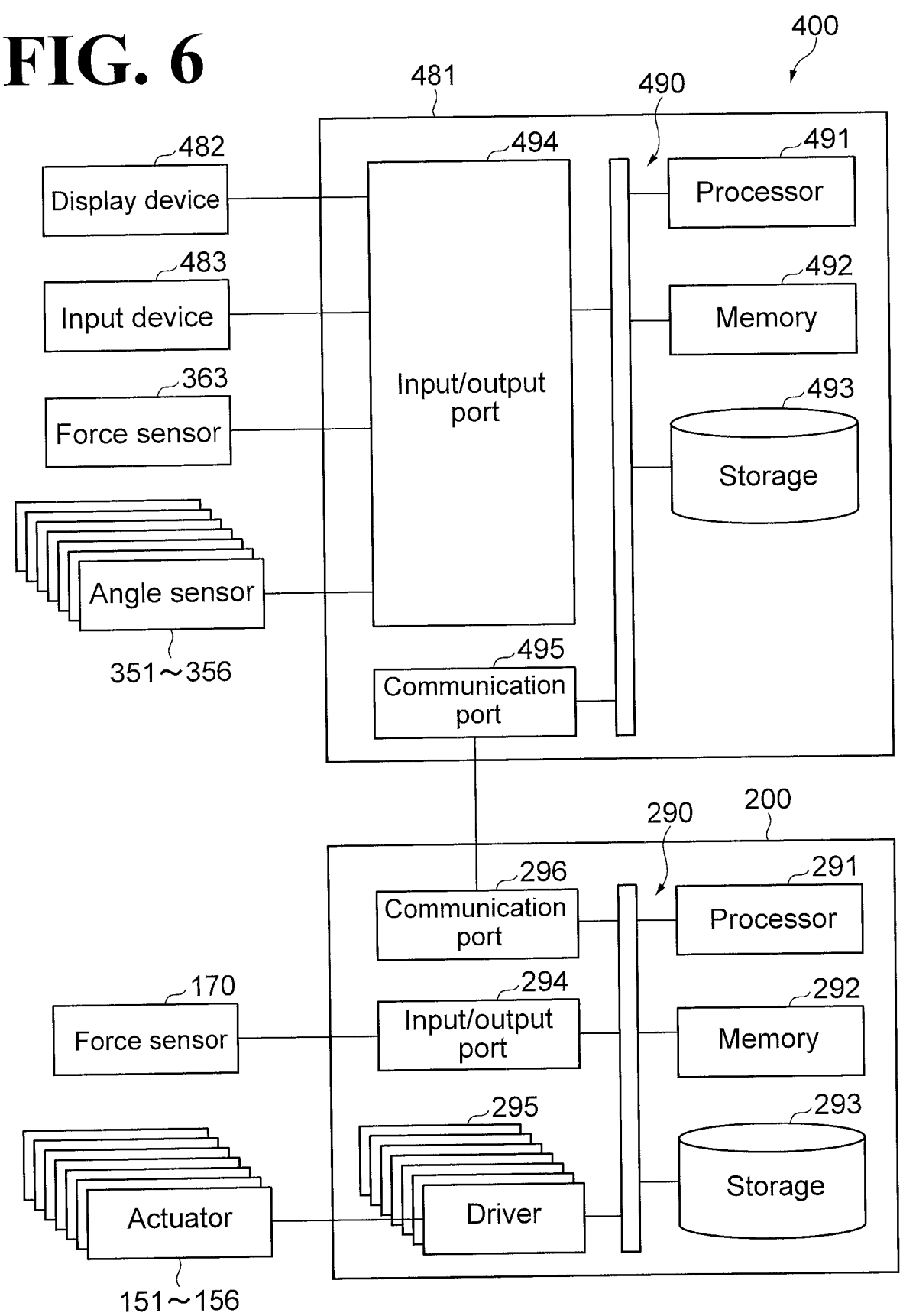
FIG. 6 is a block diagram illustrating a hardware configuration of the robot controller and the teaching computer.

As illustrated in FIG. 6, the teaching computer 400 includes a body 481, a display device 482, and an input device 483. The display device 482 and the input device 483 serve as user interfaces of the teaching computer 400. The display device 482 includes a liquid crystal monitor to show information to a user. The input device 483 is a foot switch, a keyboard, or a similar input device to obtain input information from the user. The display device 482 and the input device 483 may be integral to each other in the form of a "touch panel".

The body 481 includes circuitry 490. The circuitry 490 includes at least one processor 491, a memory 492, a storage 493, an input/output port 494, and a communication port 495. The storage 493 is a computer-readable non-volatile storage medium (for example, flash memory).

The storage 493 stores a program for causing the teaching computer 400 to execute a motion teaching method. The motion teaching method includes: obtaining reference information including information indicating the position and the posture of the demonstration tool 31 detected by the teaching motion detection device 32 with the tool indication device of the demonstration tool 31 located at a plurality of positions in the first coordinate system C1; based on the reference information, deriving coordinate system relationship information indicating a relationship between the first coordinate system C1 and the second coordinate system C2; obtaining demonstration motion information including information indicating a transition of the position and the posture of the demonstration tool 31 detected by the teaching motion detection device 32 during a demonstration using the demonstration tool 31; and generating a motion command for the leading end 110 based on the demonstration motion information and the coordinate system relationship information. The storage 493 includes: a storage area for implementing the above-described functional modules; and a storage area assigned to the model storage part 413, the model storage part 414, the coordinate information storage part 418, the posture information storage part 424, and the demonstration information storage part 426.

The memory 492 temporarily stores: the program loaded from the storage 493; and results of operations performed by the processor 491. The processor 491 cooperates with the memory 492 to execute the program, thereby implementing the functional modules of the teaching computer 400. The input/output port 494, at a command from the processor 491, obtains signals from: the angle sensors 351, 352, 353, 354, 355, and 356; the force sensor 363; and the input device 483. Then, the input/output port 494 outputs the signals to the display device 482. The communication port 495, at a command from the processor 291, performs network communication with the robot controller 200.

The robot controller 200 includes circuitry 290. The circuitry 290 includes at least one processor 291, a memory 292, a storage 293, an input/output port 294, a driver 295, and a communication port 296. The storage 293 is a computer-readable non-volatile storage medium (for example, flash memory). The storage 293 includes: a storage area for implementing the above-described functional modules; and a storage area assigned to the model storage part 211, the user coordinate system storage part 215, and the motion command storage part 216.

The memory 292 temporarily stores: a program loaded from the storage 293; and results of operations performed by the processor 291. The processor 291 cooperates with the memory 292 to execute the programs, thereby implementing the functional modules of the robot controller 200. The input/output port 294, at a command from the processor 291, obtains a signal from the force sensor 170. The driver 295, at a command from the processor 291, outputs drive power to the actuators 151, 152, 153, 154, 155, and 156. The communication port 296, at a command from the processor 291, performs network communication with the teaching computer 400.

Motion Teaching Procedure

Description will be made with regard to, as an example of the motion teaching method, a motion teaching procedure performed by the robot system 1. This procedure includes: obtaining reference information including information indicating the position and the posture of the demonstration tool 31 detected by the teaching motion detection device 32 with the tool indication device of the demonstration tool 31 located at a plurality of positions in the first coordinate system C1; based on the reference information, deriving coordinate system relationship information indicating a relationship between the first coordinate system C1 and the second coordinate system C2; obtaining demonstration motion information including information indicating a transition of the position and the posture of the demonstration tool 31 detected by the teaching motion detection device 32 during a demonstration using the demonstration tool 31; and generating a motion command for the leading end 110 based on the demonstration motion information and the coordinate system relationship information.

Figure 7:
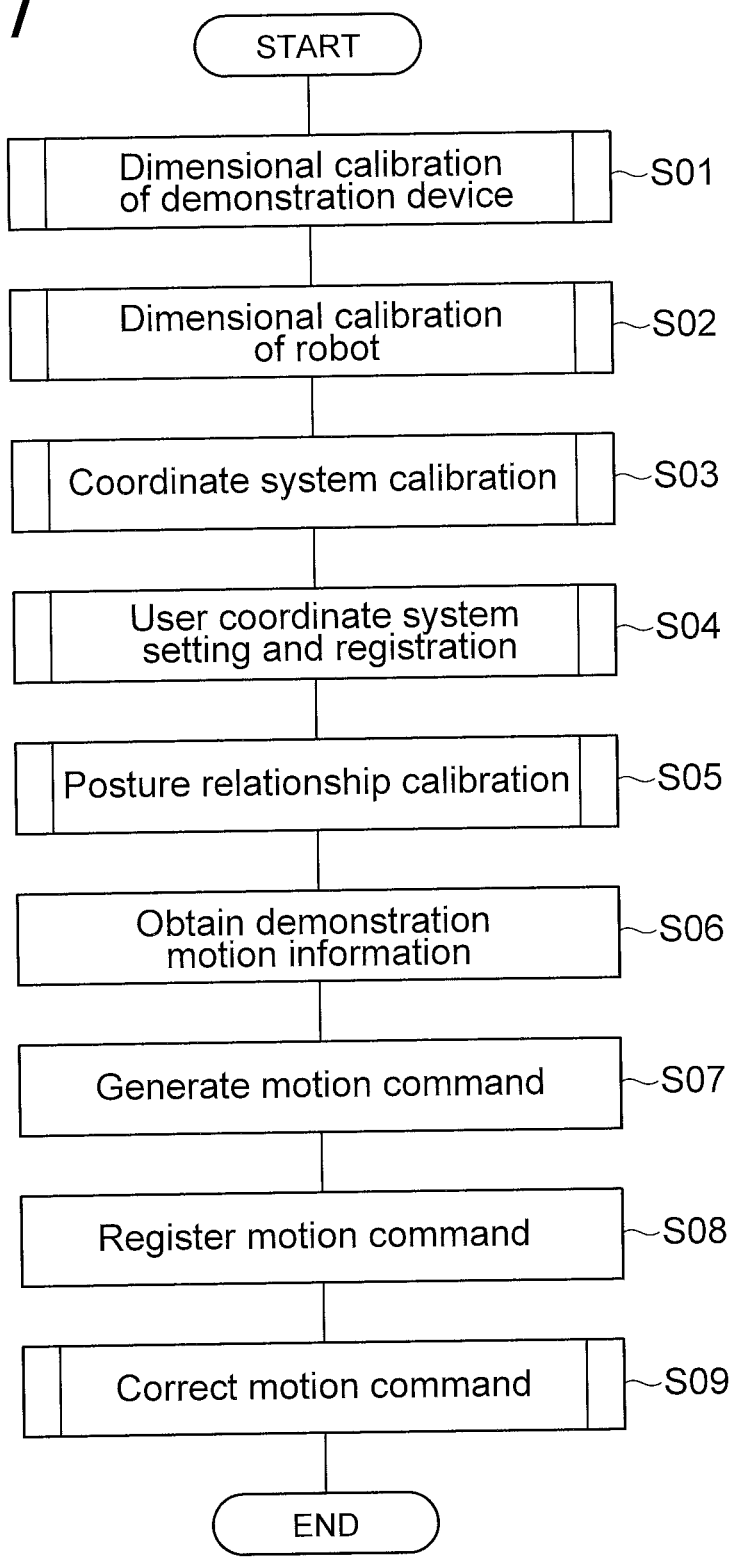
FIG. 7 is a flowchart of an example motion teaching procedure.

As illustrated in FIG. 7, the teaching computer 400 performs steps S01, S02, S03, S04, and S05. Step S01 includes obtaining: the first indication position information (information indicating the position of the spherical chip 372 on the demonstration tool 31 with the spherical tool 370 attached to the leading end 320); and the second indication position information (information indicating the position of the depression 383 on the demonstration tool 31 with the sphere receiving tool 380 attached to the leading end 320). Step S02 includes obtaining the third indication position information (information indicating the position of the depression 383 on the leading end 110 with the sphere receiving tool 380 attached to the leading end 110). Step S03 includes deriving coordinate system relationship information indicating a relationship between the first coordinate system C1 and the second coordinate system C2. Step S04 includes setting, based on the coordinate system specifying information, a third coordinate system (user coordinate system) different from the first coordinate system C1 and the second coordinate system C2. Step S05 includes deriving posture information indicating the holding posture in which the demonstration target is to be held by the demonstration tool 31.

Next, the teaching computer 400 performs steps S06, S07, and S08. At step S06, the demonstration information obtaining part 425 obtains demonstration motion information. The demonstration motion information includes: information indicating a transition of the position and the posture of the demonstration tool 31 detected by the teaching motion detection device 32 during the demonstration using the demonstration tool 31; and information indicating a transition of a force acting on the demonstration tool 31 during the demonstration (that is, the information is force information during the demonstration). At step S07, the motion command generation part 427 generates a motion command for the leading end 110 based on: demonstration motion information stored in the demonstration information storage part 426; and coordinate system relationship information stored in the coordinate information storage part 418. The motion command for the leading end 110 includes a force command indicating a desired transition of a force acting on the leading end 110 during the motion made according to the motion command. At step S08, the motion command registration part 428 registers, in the motion command storage part 216 of the robot controller 200, the motion command for the leading end 110 generated by the motion command generation part 427.

Next, the robot controller 200 performs step S09. Step S09 includes correcting the motion command for the leading end 110 so that the force information during the reproduction obtained by the force data obtaining part 221 is made as close as possible to the force command.

Description will be made with regard to details of the procedure of step S01 (procedure for indication calibration of the demonstration device), the procedure of step S02 (procedure for indication calibration of the robot), the procedure of step S03 (coordinate system calibration procedure), the procedure of step S04 (user coordinate system setting procedure), the procedure of step S05 (posture calibration procedure), and the procedure of step S09 (motion command correction procedure).

Procedure for Indication Calibration of the Demonstration Device

Figure 8:
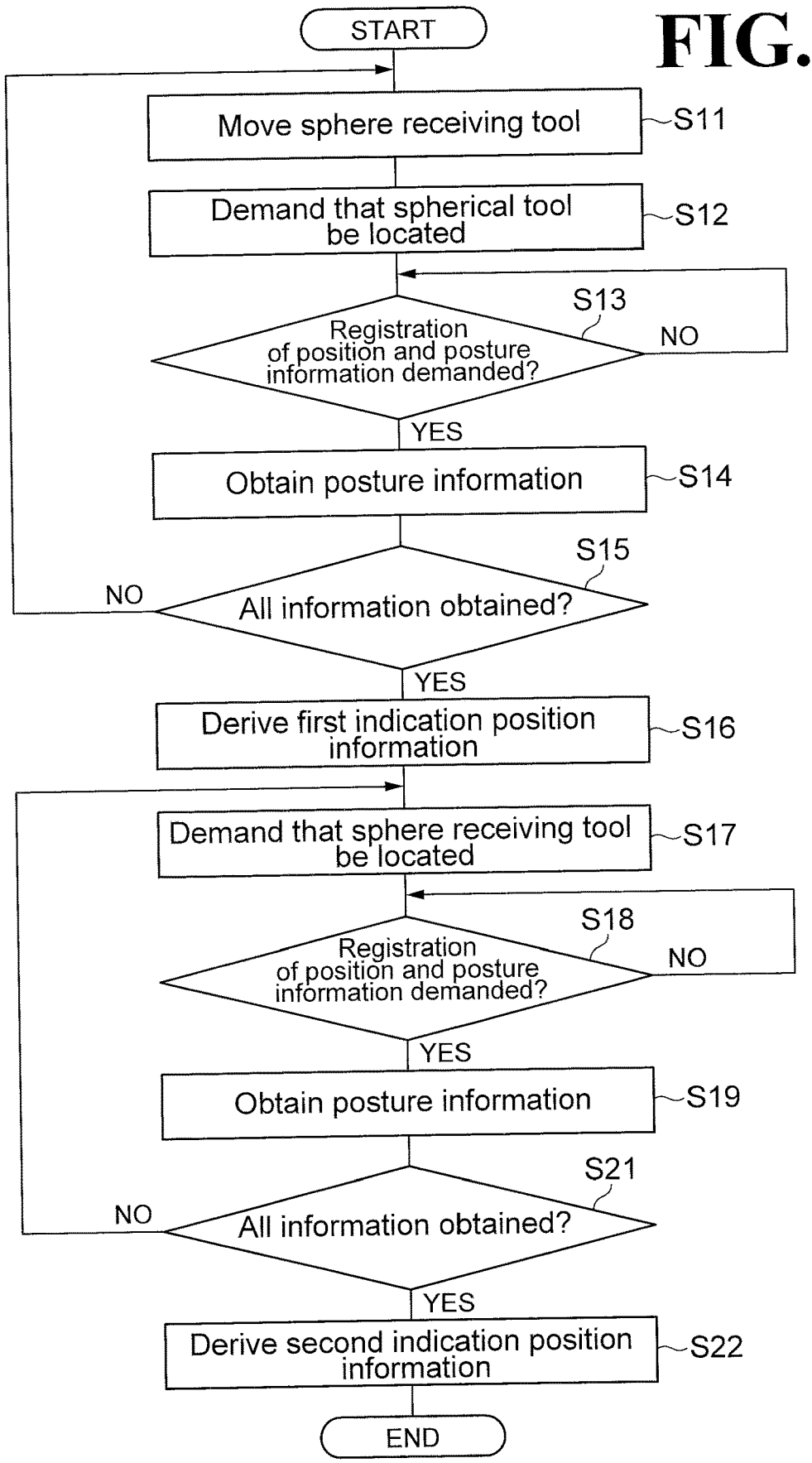
FIG. 8 is a flowchart of an example procedure for an indication calibration performed by the demonstration device.
Figure 9:
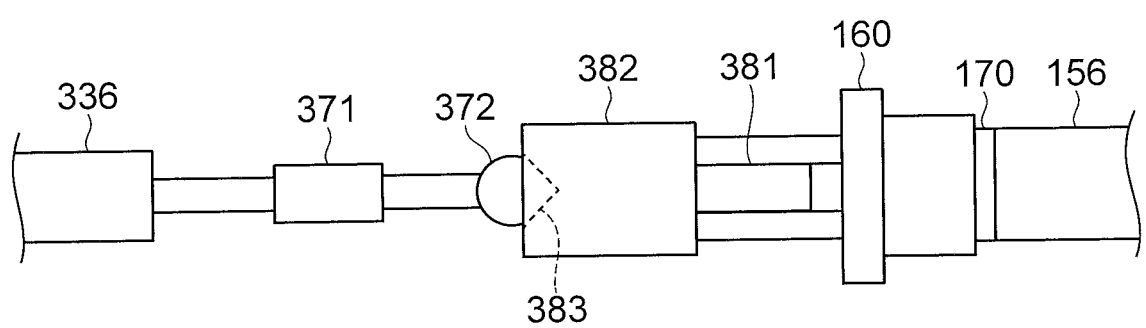
FIG. 9 is a schematic illustrating a spherical chip engaged with a depression.

As illustrated in FIG. 8, the teaching computer 400 performs steps S11 and S12. At step S11, the indication calibration part 415 makes a command to the calibration control part 214 demanding that the calibration control part 214 control the robot 100 to locate the depression 383 at a predetermined position with the sphere receiving tool 380 attached to the leading end 110. The calibration control part 214 controls the robot 100 to drive the joints 141, 142, 143, 144, 145, and 146 respectively using the actuators 151, 152, 153, 154, 155, and 156 so as to locate the depression 383 at the predetermined position. At step S12, the indication calibration part 415 displays (on the display device 482) information (image information) demanding that the spherical chip 372 be located at the predetermined position with the leading end 320 attached to the spherical tool 370. Specifically, the indication calibration part 415 displays information demanding that the spherical chip 372 be engaged with the depression 383 located at the predetermined position. In response, the worker in charge of the motion teaching makes the spherical chip 372 engaged with the depression 383 (see FIG. 9).

Next, the teaching computer 400 performs steps S13, S14, and S15. At step S13, the indication calibration part 415 waits for input of a demand for registration of information indicating the position and the posture of the demonstration tool 31. The demand for registration of the information indicating the position and the posture of the demonstration tool 31 may be input using the input device 483 (a non-limiting example is a foot switch) by the worker in charge of the motion teaching. At step S14, the indication calibration part 415 obtains angle information indicating the angles of the joints 341, 342, 343, 344, 345, and 346 respectively detected by the angle sensors 351, 352, 353, 354, 355, and 356. At step S15, the indication calibration part 415 checks whether all the information necessary for deriving the first indication position information has been obtained. Specifically, the indication calibration part 415 checks whether the information indicating the position and the posture of the demonstration tool 31 has been obtained after the demonstration tool 31 took a predetermined number of indication information obtaining postures equal to or more than the number that suffices to make derivable all the variables included in the first indication position information.

Upon determining at step S15 that not all the information necessary for deriving the first indication position information has been obtained, the teaching computer 400 returns the processing to step S02. Then, the information indicating the position and the posture of the demonstration tool 31 is repeatedly obtained until all the information necessary for deriving the first indication position information is obtained.

Upon determining at step S15 that all the information necessary for deriving the first indication position information has been obtained, the teaching computer 400 performs step S16. At step S16, the indication calibration part 415 derives the first indication position information while ensuring that the position of the spherical chip 372 in the second coordinate system C2 remains constant at any of the plurality of indication information obtaining postures, when the position of the spherical chip 372 has been derived based on: the angle information indicating the angles of the joints 341, 342, 343, 344, 345, and 346; the model information of the demonstration device 30 stored in the model storage part 413; and the first indication position information. The indication calibration part 415 regards the first indication position information that has been derived as model information of the demonstration device 30 with the spherical tool 370 attached to the leading end 320, and registers the model information in the model storage part 413.

Figure 10:
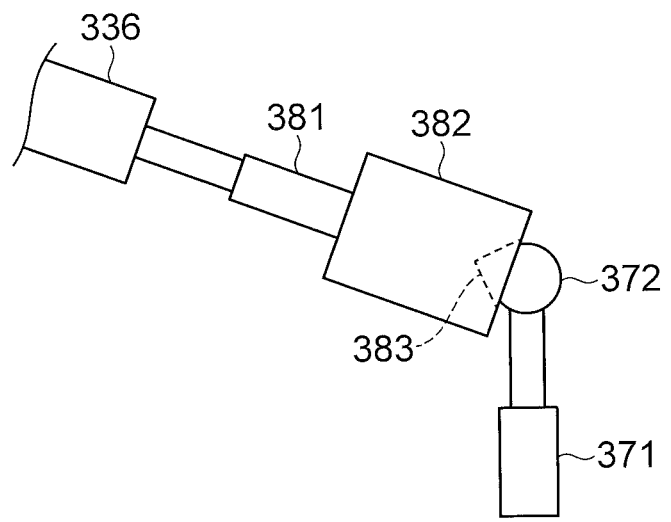
FIG. 10 is a schematic illustrating the spherical chip engaged with the depression.

Next, the teaching computer 400 performs step S17. At step S17, the indication calibration part 415 displays (on the display device 482) information (image information) demanding that the depression 383 be located at a predetermined position with the sphere receiving tool 380 attached to the leading end 320. Specifically, the indication calibration part 415 displays information demanding that the spherical tool 370 removed from the leading end 320 be fixed at a predetermined position and that the spherical chip 372 of the spherical tool 370 be engaged with the depression 383. In response, the worker in charge of the motion teaching makes the depression 383 engaged with the spherical chip 372 (see FIG. 10).

Next, the teaching computer 400 performs steps S18, S19, and S21. At step S18, the indication calibration part 415 waits for input of a demand for registration of information indicating the position and the posture of the demonstration tool 31. The demand for registration of the information indicating the position and the posture of the demonstration tool 31 may be input on the input device 483 (a non-limiting example is a foot switch) by the worker in charge of the motion teaching. At step S19, the indication calibration part 415 obtains angle information indicating the angles of the joints 341, 342, 343, 344, 345, and 346 respectively detected by the angle sensors 351, 352, 353, 354, 355, and 356. At step S21, the indication calibration part 415 checks whether all the information necessary for deriving the second indication position information has been obtained. Specifically, the indication calibration part 415 checks whether the information indicating the position and the posture of the demonstration tool 31 has been obtained after the demonstration tool 31 took a predetermined number of indication information obtaining postures equal to or more than the number that suffices to make derivable all the variables included in the second indication position information.

Upon determining at step S21 that not all the information necessary for deriving the second indication position information has been obtained, the teaching computer 400 returns the processing to step S17. Then, the information indicating the position and the posture of the demonstration tool 31 is repeatedly obtained until all the information necessary for deriving the second indication position information is obtained.

Upon determining at step S21 that all the information necessary for deriving the second indication position information has been obtained, the teaching computer 400 performs step S22. At step S22, the indication calibration part 415 derives the second indication position information while ensuring that the position of the depression 383 remains constant at any of the plurality of indication information obtaining postures, when the position of the depression 383 has been derived based on: the angle information indicating the angles of the joints 341, 342, 343, 344, 345, and 346; the model information of the demonstration device 30 stored in the model storage part 413; and the second indication position information. The indication calibration part 415 regards the second indication position information that has been derived as model information of the demonstration device 30 with the sphere receiving tool 380 attached to the leading end 320, and registers the model information in the model storage part 413. Thus, the procedure for the indication calibration of the demonstration device 30 is completed.

Procedure for Indication Calibration of the Robot

Figure 11:
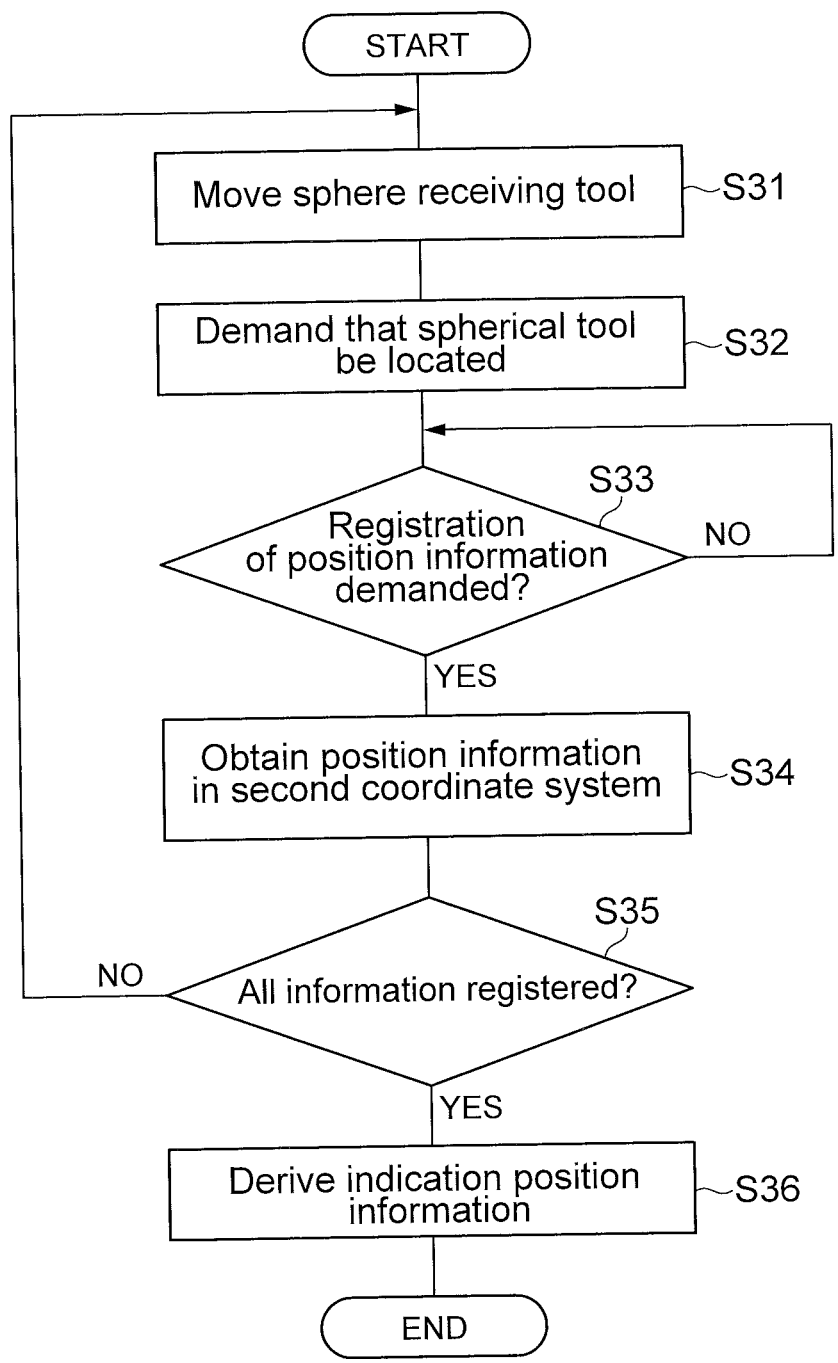
FIG. 11 is a flowchart of an example procedure for an indication calibration performed by the robot.

As illustrated in FIG. 11, the teaching computer 400 performs steps S31 and S32. At step S31, the indication calibration part 415 makes a command to the calibration control part 214 demanding that the calibration control part 214 control the robot 100 to locate the leading end 110 at a predetermined position and a predetermined posture with the sphere receiving tool 380 attached to the leading end 110. The calibration control part 214 controls the robot 100 to drive the joints 141, 142, 143, 144, 145, and 146 respectively using the actuators 151, 152, 153, 154, 155, and 156 so as to locate the leading end 110 at the predetermined position and the predetermined posture. At step S32, the indication calibration part 415 displays (on the display device 482) information demanding that the spherical chip 372 be engaged with the depression 383 with the leading end 320 attached to the spherical tool 370. In response, the worker in charge of the motion teaching makes the spherical chip 372 engaged with the depression 383 (see FIG. 9).

Next, the teaching computer 400 performs steps S33, S34, and S35. At step S33, the indication calibration part 415 waits for input of a demand for registration of position information indicating the position of the spherical chip 372. The demand for registration of the position information indicating the position of the spherical chip 372 may be input using the input device 483 (a non-limiting example is a foot switch) by the worker in charge of the motion teaching. At step S34, the indication calibration part 415 obtains angle information indicating the angles of the joints 341, 342, 343, 344, 345, and 346 respectively detected by the angle sensors 351, 352, 353, 354, 355, and 356 with the spherical chip 372 engaged with the depression 383. Then, the indication calibration part 415 derives position information (position information in the second coordinate system) indicating the position of the spherical chip 372 based on the angle information and the model information of the demonstration device 30 stored in the model storage part 413. At step S35, the indication calibration part 415 checks whether all the information necessary for deriving the third indication position information has been obtained. Specifically, the indication calibration part 415 checks whether all the information of the displacement of the spherical chip 372 has been obtained so that all the variables included in the third indication position information are derivable.

Upon determining at step S35 that not all the information necessary for deriving the third indication position information has been obtained, the teaching computer 400 returns the processing to step S31. Then, the position information indicating the position of the spherical chip 372 is repeatedly obtained until all the information necessary for deriving the third indication position information is obtained.

Upon determining at step S35 that all the information necessary for deriving the third indication position information has been obtained, the teaching computer 400 performs step S36. At step S36, the indication calibration part 415 derives the third indication position information based on a displacement of the depression 383 that is based on a change in the posture of the leading end 110 of the robot 100. The indication calibration part 415 regards the third indication position information that has been derived as model information of the robot 100 with the sphere receiving tool 380 attached to the leading end 110, and registers the model information in the model storage part 414. Thus, the procedure for the indication calibration of the robot 100 is completed.

Coordinate System Calibration Procedure

Figure 12:
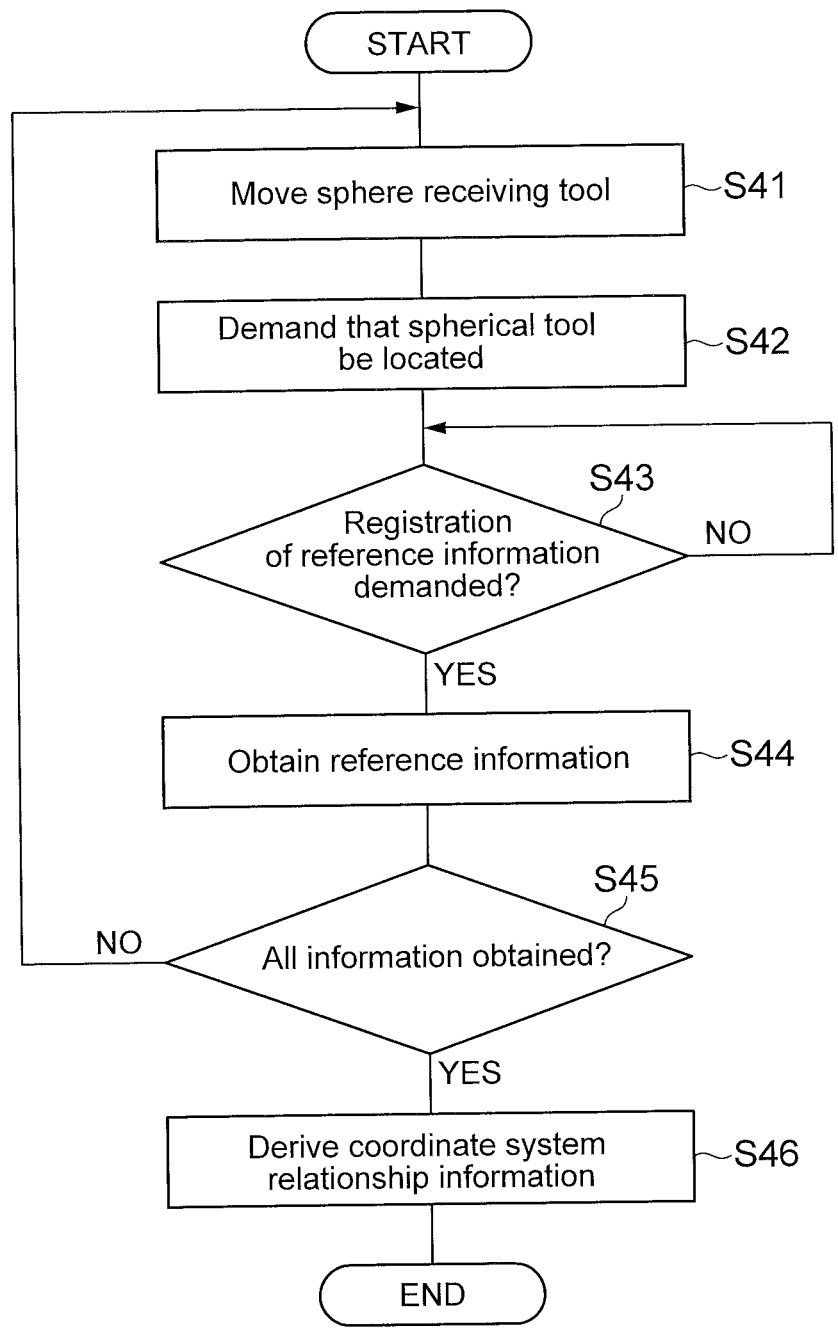
FIG. 12 is a flowchart of an example coordinate system calibration procedure.

As illustrated in FIG. 12, the teaching computer 400 performs steps S41 and S42. At step S41, the first obtaining part 431 makes a command to the calibration control part 214 demanding that the calibration control part 214 control the robot 100 to locate the depression 383 at a preset reference information obtaining spot with the sphere receiving tool 380 attached to the leading end 110. The calibration control part 214 controls the robot 100 to drive the joints 141, 142, 143, 144, 145, and 146 respectively using the actuators 151, 152, 153, 154, 155, and 156 so as to locate the depression 383 at the reference information obtaining spot. At step S42, the second obtaining part 432 displays (on the display device 482) information (image information) demanding that the spherical chip 372 be located at the reference information obtaining spot with the leading end 320 attached to the spherical tool 370. For example, the indication calibration part 415 displays information demanding that the spherical chip 372 be engaged with the depression 383 located at the reference information obtaining spot. In response, the worker in charge of the motion teaching makes the spherical chip 372 engaged with the depression 383 (see FIG. 9).

Next, the teaching computer 400 performs steps S43, S44, and S45. At step S43, the reference information obtaining part 416 waits for input of a demand for registration of the reference information. The demand for registration of the reference information may be input using the input device 483 (a non-limiting example is a foot switch) by the worker in charge of the motion teaching. At step S44, the reference information obtaining part 416 obtains reference information. Specifically, the first obtaining part 431 performs a direct kinematics operation based on: the angle information indicating the angles of the joints 141, 142, 143, 144, 145, and 146 obtained by the angle information obtaining part 412; and the model information of the robot 100 stored in the model storage part 414. By performing the direct kinematics operation, the first obtaining part 431 derives position information indicating the position of the sphere receiving portion 382 in the first coordinate system C1. The second obtaining part 432 obtains angle information indicating the angles of the joints 341, 342, 343, 344, 345, and 346 obtained by the angle information obtaining part 411 with the spherical chip 372 engaged with the depression 383 of the sphere receiving portion 382. At step S45, the reference information obtaining part 416 checks whether all the information necessary for deriving coordinate system relationship information has been obtained. Specifically, the reference information obtaining part 416 checks whether the reference information has been obtained at a predetermined number of reference information obtaining spots equal to or more than a number that suffices to derive all the variables included in the coordinate system relationship information.

Upon determining at step S45 that not all the information necessary for deriving the coordinate system relationship information has been obtained, the teaching computer 400 returns the processing to step S41. Then, the depression 383 is repeatedly moved to reference information obtaining spots and the reference information is repeatedly obtained until all the information necessary for deriving the coordinate system relationship information is obtained.

Upon determining at step S45 that all the information necessary for deriving the coordinate system relationship information has been obtained, the teaching computer 400 performs step S46. At step S46, the coordinate system calibration part 417 derives, based on the reference information, the coordinate system relationship information indicating a relationship between the first coordinate system C1 and the second coordinate system C2, and registers the coordinate system relationship information in the coordinate information storage part 418. Thus, the coordinate system calibration procedure is completed.

User Coordinate System Setting Procedure

Figure 13:
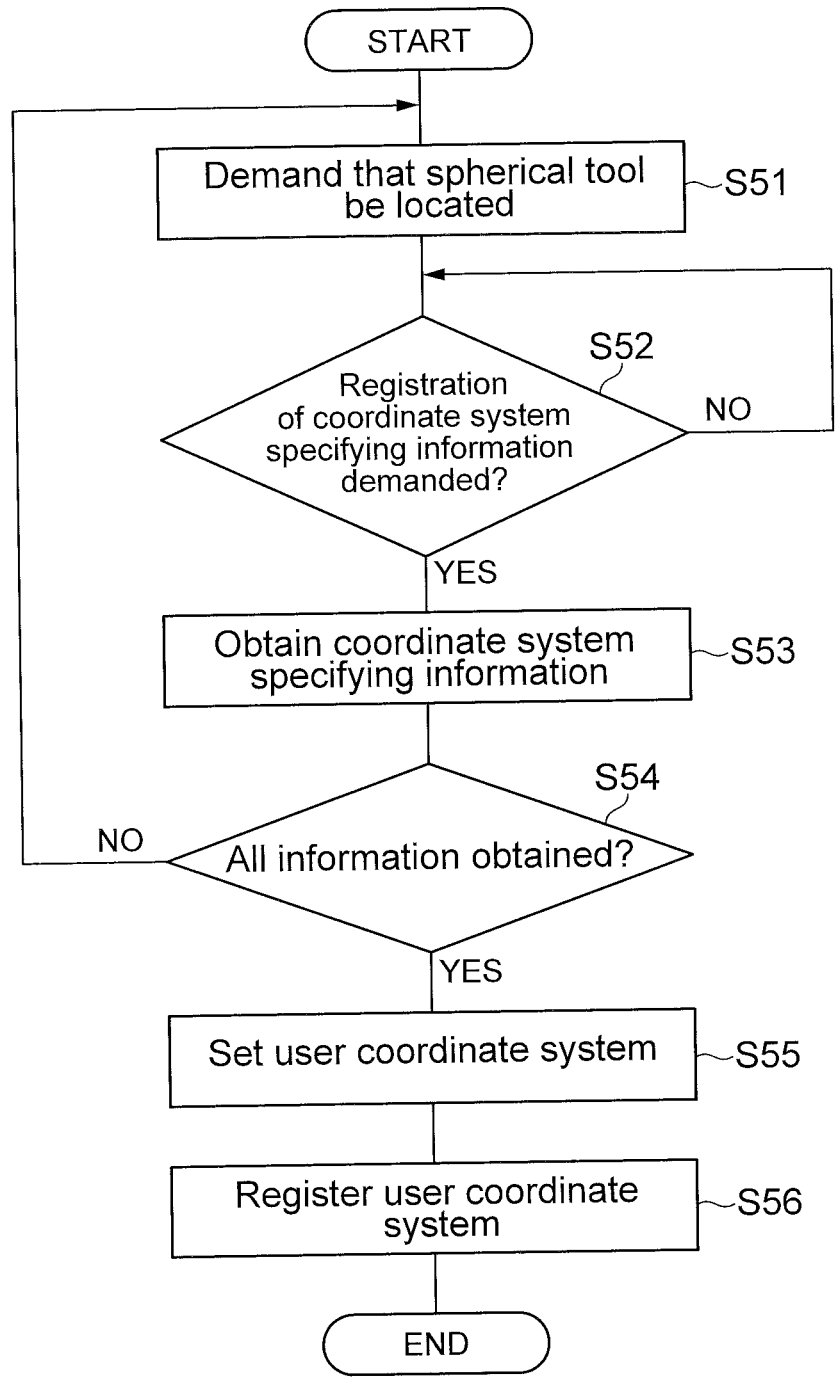
FIG. 13 is a flowchart of an example user coordinate system setting procedure.
Figure 14:
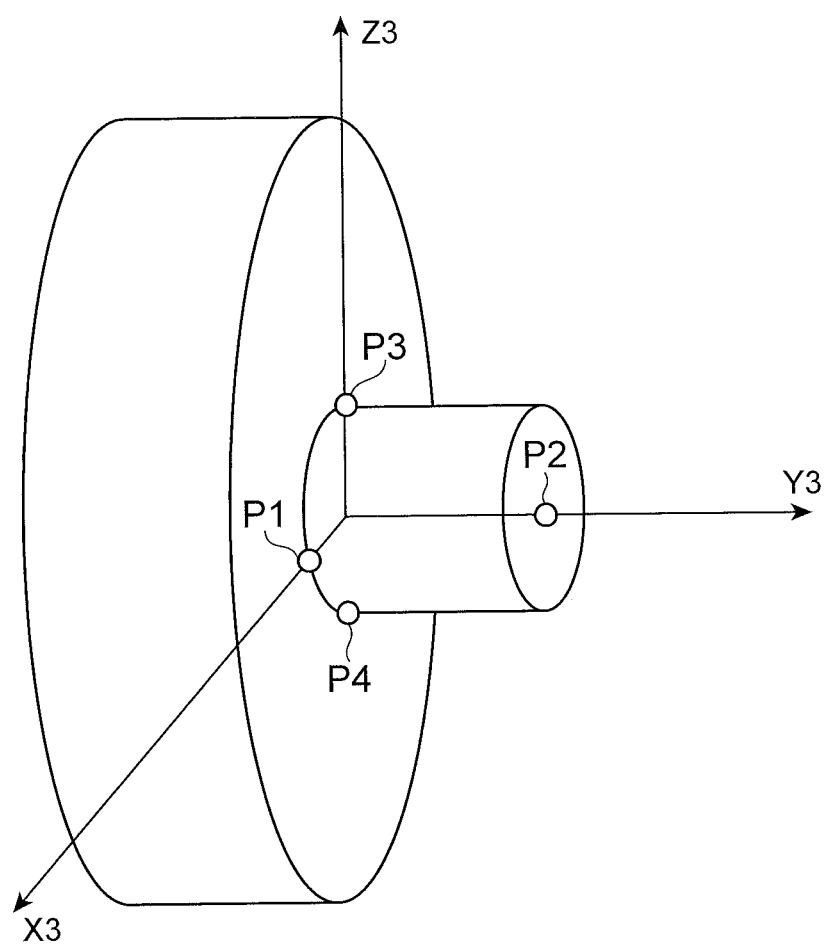
FIG. 14 is a schematic illustrating a plurality of example coordinate system specified spots to which the spherical chip is moved.

As illustrated in FIG. 13, the teaching computer 400 performs step S51. At step S51, the coordinate system specification obtaining part 419 displays (on the display device 482) information (image information) demanding that the spherical chip 372 be located at the plurality of coordinate system specified spots with the leading end 320 attached to the spherical tool 370. In response, the worker in charge of the motion teaching makes the spherical chip 372 located at the plurality of coordinate system specified spots (see FIG. 14). Examples of the plurality of coordinate system specified spots are coordinate system specified spots P1, P2, P3, and P4 illustrated in FIG. 14. Each of the coordinate system specified spots P1, P2, P3, and P4 is specified to be located on any one of coordinate axes X3, Y3, and Z3 of the third coordinate system C3 of the setting target.

Next, the teaching computer 400 performs steps S52, S53, and S54. At step S52, the coordinate system specification obtaining part 419 waits for input of a demand for registration of the coordinate system specifying information. The demand for registration of the coordinate system specifying information may be input using the input device 483 (a non-limiting example is a foot switch) by the worker in charge of the motion teaching. At step S53, with the spherical chip 372 located at the plurality of coordinate system specified spots, the coordinate system specification obtaining part 419 obtains the angle information indicating the angles of the joints 341, 342, 343, 344, 345, and 346 respectively detected by the angle sensors 351, 352, 353, 354, 355, and 356. At step S54, the coordinate system specification obtaining part 419 checks whether all the information necessary for setting the third coordinate system C3 (user coordinate system) has been obtained. Specifically, the coordinate system specification obtaining part 419 checks whether the coordinate system specifying information has been obtained at a number of coordinate system specified spots equal to or more than a number that suffices to derive all the definition information of the third coordinate system C3.

Upon determining at step S54 that not all the information necessary for setting the third coordinate system C3 has been obtained, the teaching computer 400 returns the processing to step S51. Then, the coordinate system specifying information is repeatedly obtained until all the information necessary for setting the third coordinate system C3 is obtained.

Upon determining at step S54 that all the information necessary for setting the third coordinate system C3 has been obtained, the teaching computer 400 performs steps S55 and S56. At step S55, the coordinate system setting part 421 sets the third coordinate system C3 based on the coordinate system specifying information obtained by the coordinate system specification obtaining part 419. Specifically, the coordinate system setting part 421 derives the positions of the plurality of coordinate system specified spots in the second coordinate system C2 based on the angle information indicating the angles of the joints 341, 342, 343, 344, 345, and 346 and based on the model information stored in the model storage part 413. Then, based on the positions that have been derived, the coordinate system setting part 421 derives definition information of the third coordinate system in the second coordinate system C2 (information defining the third coordinate system). At step S56, the user coordinate system registration part 422 registers, in the user coordinate system storage part 215 of the robot controller 200, the definition information of the third coordinate system C3 set by the coordinate system setting part 421. The user coordinate system registration part 422 may convert the definition information of the third coordinate system C3 in the second coordinate system C2 into definition information of the third coordinate system C3 in the first coordinate system C1 based on the coordinate system relationship information, and register the resulting definition information in the user coordinate system storage part 215. Thus, the user coordinate system setting procedure is completed.

Posture Calibration Procedure

Figure 15:
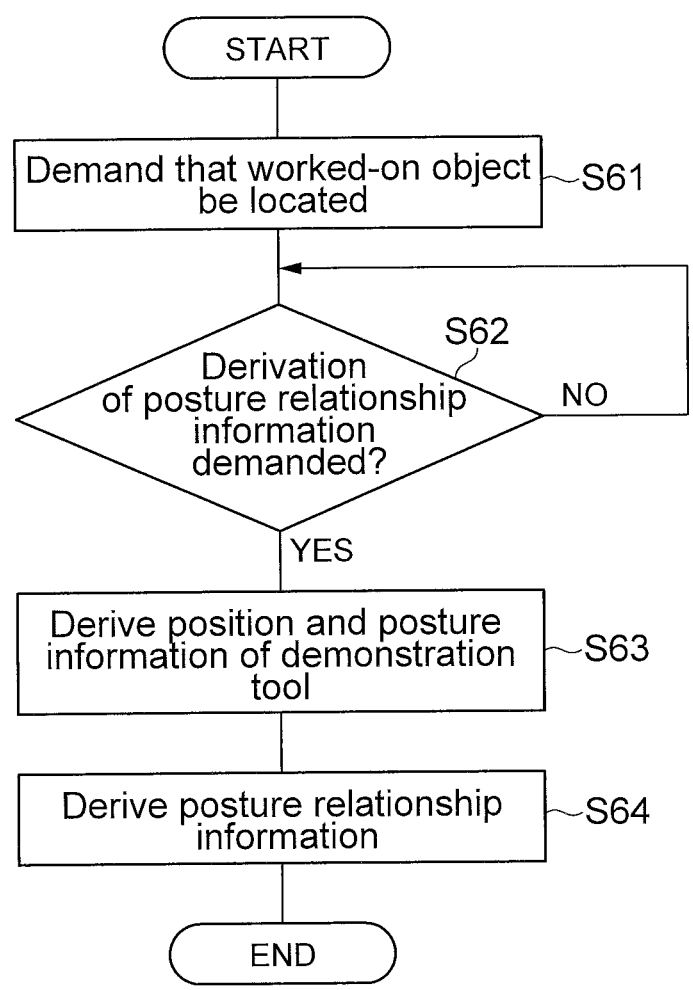
FIG. 15 is a flowchart of an example posture calibration procedure.
Figure 16:
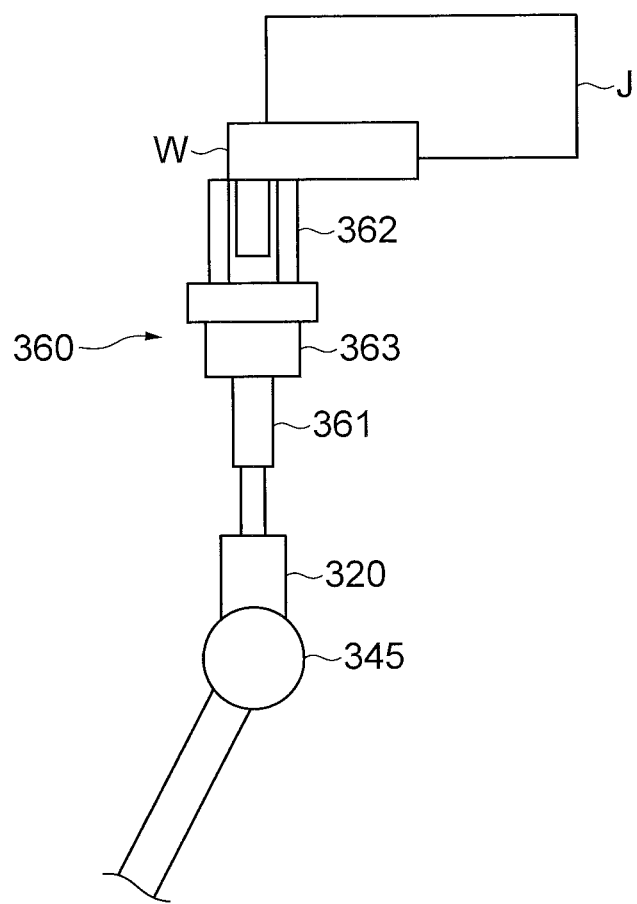
FIG. 16 is a schematic illustrating the position and the posture of a workpiece adapted to a positioning jig.

As illustrated in FIG. 15, the teaching computer 400 performs step S61. At step S61, with the demonstration tool 360 being attached to the leading end 320 and holding the workpiece W, the posture calibration part 423 displays (on the display device 482) information (image information) demanding that the workpiece W be located at a predetermined position and a predetermined posture. In response, the worker in charge of the motion teaching makes the workpiece W located at the predetermined position and the predetermined posture. Specifically, the worker adjusts the position and the posture of the workpiece W to the position and the posture of a positioning jig J located in advance at a predetermined position (see FIG. 16).

Next, the teaching computer 400 performs steps S62, S63, and S64. At step S62, the posture calibration part 423 waits for input of a demand for derivation of the posture information. The demand for derivation of the posture information may be input using the input device 483 (a non-limiting example is a foot switch) by the worker in charge of the motion teaching. At step S63, with the demonstration tool 360 being attached to the leading end 320 and holding the workpiece W and with the workpiece W being located at a predetermined position and a predetermined posture, the posture calibration part 423 obtains the angle information indicating the angles of the joints 341, 342, 343, 344, 345, and 346 respectively detected by the angle sensors 351, 352, 353, 354, 355, and 356. Then, based on the angle information that has been obtained and based on the model information stored in the model storage part 413, the posture calibration part 423 derives information indicating the position and the posture of the demonstration tool 360. At step S64, based on the position and the posture at which the workpiece W is located and based on the position and the posture of the demonstration tool 360 that have been derived, the posture calibration part 423 derives the holding posture in which the workpiece W is to be held by the demonstration tool 360. Then, the posture calibration part 423 registers the posture information that has been derived in the posture information storage part 424. Thus, the posture calibration procedure is completed.

Motion Command Correction Procedure

Figure 17:
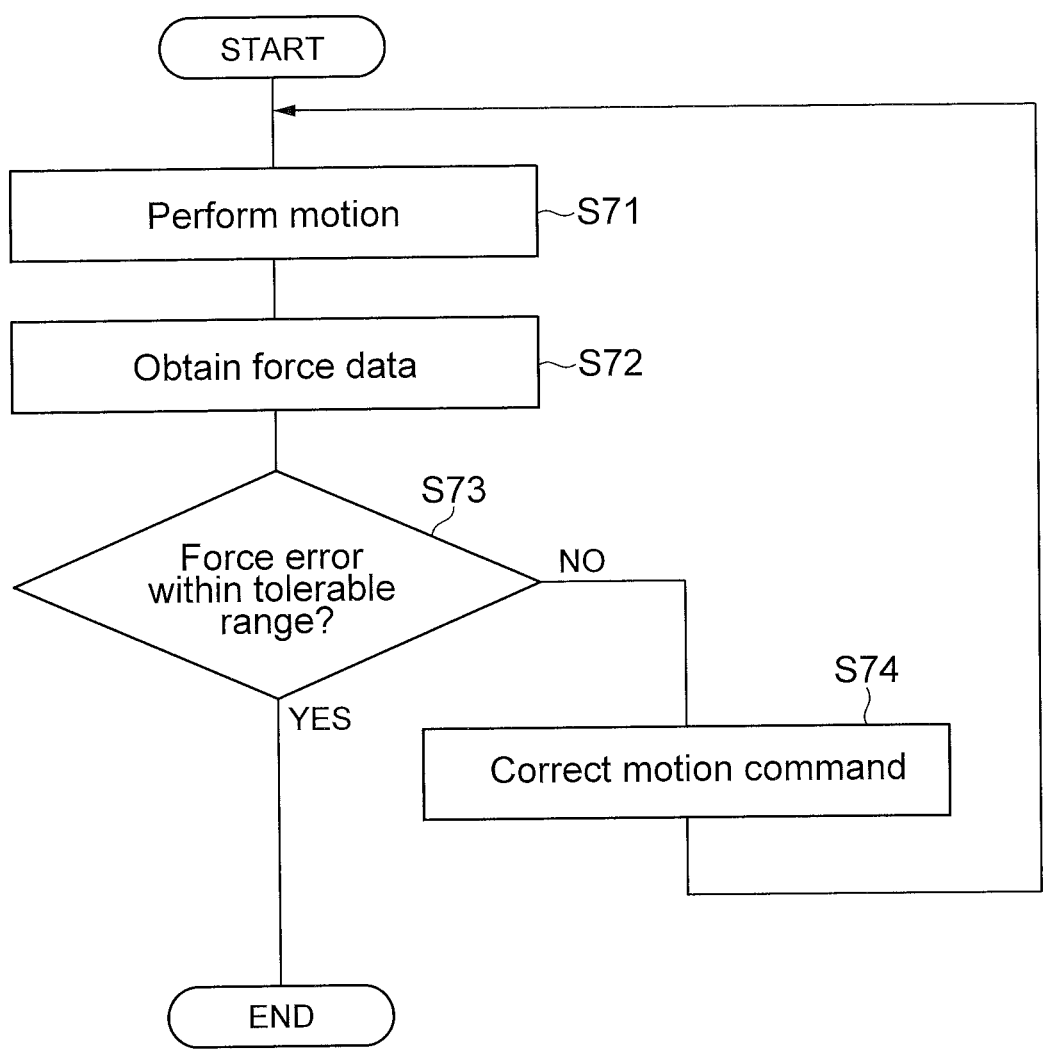
FIG. 17 is a flowchart of an example motion command correction procedure.

As illustrated in FIG. 17, the robot controller 200 performs steps S71, S72, and S73. At step S71, the learning processing part 222 causes the reproduction processing part 217 to perform reproduction processing of the motion command stored in the motion command storage part 216. At step S72, the learning processing part 222 obtains, from the force data obtaining part 221, force information (force information during the reproduction) as of the time during a motion that the robot is making based on the motion command. At step S73, the learning processing part 222 checks whether the difference between the force information during the reproduction and the force command is within a tolerable range.

Upon determining at step S73 that the difference between the force information during the reproduction and the force command is not within the tolerable range, the robot controller 200 performs step S74. At step S74, in order to make the force information during the reproduction as close as possible to the force command, the learning processing part 222 makes minor adjustments to the target position and the target posture of the leading end 110 stored in the motion command storage part 216. Then, the robot controller 200 returns the processing to step S71. Then, minor adjustments are repeatedly made to the target position and the target posture of the leading end 110 until the difference between the force information during the reproduction and the force command falls within the tolerable range.

Upon determining at step S73 that the difference between the force information during the reproduction and the force command is within the tolerable range, the robot controller 200 ends the processing. Thus, the motion command correction procedure is completed.

Advantageous Effects of the Embodiment

As has been described hereinbefore, the motion teaching apparatus 3 includes the demonstration device 30, the reference information obtaining part 416, the coordinate system calibration part 417, the demonstration information obtaining part 425, and the motion command generation part 427. The demonstration device 30 includes the demonstration tool 31 and the teaching motion detection device 32. The demonstration tool 31 is for performing a demonstration to teach a motion to the robot 100. The teaching motion detection device 32 detects the position and the posture of the demonstration tool 31 in the second coordinate system C2 (demonstration coordinate system), which is different from the first coordinate system C1 (robot coordinate system). The reference information obtaining part 416 obtains information indicating the position and the posture of the demonstration tool 31 detected by the teaching motion detection device 32 with the tool indication device (the spherical chip 372) of the demonstration tool 31 located at the plurality of positions in the first coordinate system C1. Based on the information obtained by the reference information obtaining part 416, the coordinate system calibration part 417 derives coordinate system relationship information indicating a relationship between the first coordinate system C1 and the second coordinate system C2. The demonstration information obtaining part 425 obtains information indicating a transition of the position and the posture of the demonstration tool 31 detected by the teaching motion detection device 32 during the demonstration using the demonstration tool 31. The motion command generation part 427 generates a motion command for the leading end 110 of the robot 100 based on the information obtained by the demonstration information obtaining part 425 and based on the coordinate system relationship information.

The motion teaching apparatus 3 ensures that by performing work as simple as locating the tool indication device at a plurality of positions in the first coordinate system C1, the reference information obtaining part 416 and the coordinate system calibration part 417 are able to derive the coordinate system relationship information indicating a relationship between the first coordinate system C1 and the second coordinate system C2. Then, the motion command for the leading end 110 is generated based on the information obtained by the demonstration of moving the demonstration tool 31 and based on the coordinate system relationship information. Thus, the motion teaching is performed in a simplified manner. That is, the motion teaching apparatus 3 is effective for making the motion teaching to the robot 100 easier to perform.

The motion teaching apparatus 3 may further include a posture calibration part. When the demonstration is performed with the demonstration tool 31 holding a demonstration target to teach the robot 100 to perform the motion with the leading end 110 holding a worked-on object, the posture calibration part obtains the position and the posture of the demonstration tool 31 that respectively correspond to a predetermined position and a predetermined posture at which the demonstration target is to be located; and based on the position and the posture of the demonstration tool 31 that have been obtained, derives posture information indicating the holding posture in which the demonstration target is to be held by the demonstration tool 31. The motion command generation part 427 may generate the motion command for the leading end 110 based on: the demonstration motion information; the coordinate system relationship information; and the posture information. This ensures that the motion teaching is performed easily even when the motion teaching takes into consideration the holding posture in which the demonstration target is to be held by the demonstration tool 31.

The motion teaching apparatus 3 may further include the indication calibration part 415. Based on a plurality of positions and postures of the demonstration tool 31 detected by the teaching motion detection device 32 with the position of the tool indication device fixed, the indication calibration part 415 derives indication position information indicating the position of the tool indication device on the demonstration tool 31. The coordinate system calibration part 417 may derive the coordinate system relationship information based on the information obtained by the reference information obtaining part 416 and based on the indication position information. This ensures that the motion teaching is performed easily even when the motion teaching takes into consideration an error of the position of the tool indication device on the demonstration tool 31.

The reference information obtaining part 416 may include the first obtaining part 431 and the second obtaining part 432. Based on the postures of the robot 100 respectively corresponding to a plurality of reference information obtaining spots at which the robot indication device (the sphere receiving portion 382) of the robot 100 is located, the first obtaining part 431 derives information indicating the positions of the plurality of reference information obtaining spots in the first coordinate system C1. The second obtaining part 432 obtains information indicating positions and postures of the demonstration tool 31 detected by the teaching motion detection device 32 with the tool indication device in contact with the robot indication device located at the plurality of reference information obtaining spots. This ensures that the positions of the plurality of reference information obtaining spots at which the robot indication device is located in the first coordinate system C1 are easily derived based on the postures of the robot 100. Also, the information indicating the position and the posture of the demonstration tool 31 detected by the teaching motion detection device 32 is obtained with the tool indication device in contact with the robot indication device located at the plurality of reference information obtaining spots. With this configuration, the robot indication device serves as a marker for the plurality of positions in the first coordinate system C1. This makes easier the work of locating the tool indication device at a plurality of positions in the first coordinate system C1. Thus, the motion teaching is performed in an even easier manner.

The tool indication device may be engageable with the robot indication device. This ensures that the work of locating the tool indication device at a plurality of positions in the first coordinate system C1 is performed in an even easier manner.

The tool indication device may be configured to suck the robot indication device. This ensures that the work of locating the tool indication device at a plurality of positions in the first coordinate system C1 is performed in an even easier manner.

The teaching motion detection device 32 may include the passive multi-articular arm 330 and the sensor. The passive multi-articular arm 330 is connected to the demonstration tool 31 and operates based on the position and the posture of the teaching motion detection device 32. The sensor detects the posture of the passive multi-articular arm 330. This ensures that the position and the posture of the demonstration tool 31 are detected with improved accuracy by contact-type sensing, resulting in more reliable motion teaching. It is to be noted that in the configuration in which the teaching motion detection device 32 includes the passive multi-articular arm 330, the passive multi-articular arm 330 may possibly become an obstacle after the motion teaching, but moving the passive multi-articular arm 330 to get it out of the way may cause a change in the relationship between the first coordinate system C1 and the second coordinate system C2. In this case, the above-described advantageous effect of easily deriving the relationship between the first coordinate system C1 and the second coordinate system C2 will be more highly appreciated.

The motion teaching apparatus 3 may further include the coordinate system specification obtaining part 419 and the coordinate system setting part 421. The coordinate system specification obtaining part 419 obtains information indicating positions and postures of the demonstration tool 31 detected by the teaching motion detection device 32 with the tool indication device located at a plurality of coordinate system specified spots. Based on the information obtained by the coordinate system specification obtaining part 419, the coordinate system setting part 421 sets a third coordinate system (user coordinate system), which is different from the first coordinate system C1 and the second coordinate system C2. This ensures that the motion teaching apparatus 3 can be effectively used to set any desired coordinate system.

The tool indication device may be attachable and detachable to and from the demonstration tool 31. In this case, removing the tool indication device makes the demonstration even easier.

Non-limiting modifications of the above-described embodiment will be described. In the above-described embodiment, the reference information is obtained in such a manner that the spherical chip 372 of the spherical tool 370 attached to the leading end 320 is engaged with the depression 383 of the sphere receiving tool 380 attached to the leading end 110. This configuration, however, is not intended in a limiting sense.

The reference information obtaining spots used to obtain the reference information may be set in any other manner insofar as the positions of the reference information obtaining spots in the first coordinate system C1 can be identified. For example, the reference information obtaining spots may be set at positions apart from the robot 100 (for example, on the surface of the grinder 4) insofar as the positions of the reference information obtaining spots in the first coordinate system C1 can be identified. This ensures that the motion teaching can be performed by a demonstration even when the demonstration device 30 is away from the robot 100 and it is impossible to make a contact state between the spherical chip 372 of the spherical tool 370 attached to the leading end 320 and the sphere receiving portion 382 attached to the leading end 110. Also, even when the reference information obtaining spots are set in a remote area far away from the robot 100, the coordinate system relationship information can be derived using the reference information obtaining spots insofar as the positions of the reference information obtaining spots in the first coordinate system C1 can be identified. A motion teaching grinder 4 may be located at a position away from the grinder 4 used by the robot 100 and may be used in a demonstration to teach the robot 100 to perform a motion. In this case, insofar as the position of the motion teaching grinder 4 in the first coordinate system C1 can be identified, it is possible to derive the coordinate system relationship information by setting the reference information obtaining spots on the surface of the grinder 4.

While in the above-described embodiment a single circuit 290 is used to perform the functional modules of the robot controller 200, this configuration is not intended in a limiting sense; it is also possible to use a plurality of circuits to perform the respective functional modules of the robot controller 200. While in the above-described embodiment a single circuit 490 is used to perform the functional modules of the teaching computer 400, this configuration is not intended in a limiting sense; it is also possible to use a plurality of circuits to perform the respective functional modules of the teaching computer 400.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A motion teaching apparatus comprising:
    a demonstration device comprising:
        a demonstration tool to perform a demonstration to teach a robot how to move, the robot comprising a leading end and a multi-articular arm which is configured to change a position of the leading end in a first coordinate system; and
    a teaching motion detection device configured to detect a position of the demonstration tool in a second coordinate system different from the first coordinate system; and
    circuitry configured to:
        derive coordinate system relationship information indicating a relationship between the first coordinate system and the second coordinate system based on a position of the demonstration tool in the first coordinate system at at least one spot and based on the position of the demonstration tool in the second coordinate system detected by the teaching motion detection device at the at least one spot;
        obtain a transition of the position of the demonstration tool detected by the teaching motion detection device during the demonstration using the demonstration tool; and
        generate a motion command to control motion of the leading end of the robot based on the transition and based on the coordinate system relationship information.

2. The motion teaching apparatus according to claim 1, wherein when the demonstration is performed with the demonstration tool holding a demonstration target to teach the robot to perform the motion with the leading end of the robot holding a worked-on object, the circuitry is configured to:
    obtain a posture of the demonstration tool that corresponds to a predetermined posture of the demonstration target;
    derive, based on the posture of the demonstration tool that have been obtained, posture information indicating a holding posture in which the demonstration target is to be held by the demonstration tool; and
    generate the motion command for the leading end based on the coordinate system relationship information and the posture information.

3. The motion teaching apparatus according to claim 1, wherein the teaching motion detection device is configured to detect a plurality of positions and postures of the demonstration tool in a state in which a tool indication device provided at the demonstration tool stops, and
wherein the circuitry is configured to:
    derive indication position information indicating a position of the tool indication device on the demonstration tool based on the plurality of positions and postures of the demonstration tool that have been detected; and
    derive the coordinate system relationship information based on the position and the posture of the demonstration tool detected by the teaching motion detection device and based on the indication position information.

4. The motion teaching apparatus according to claim 1, wherein the circuitry is configured to:
    derive, based on postures of the robot respectively corresponding to a plurality of reference information obtaining spots at which a robot indication device of the robot is located, information indicating positions of the plurality of reference information obtaining spots in the first coordinate system; and obtain information indicating positions and postures of the demonstration tool detected by the teaching motion detection device with a tool indication device of the demonstration tool in contact with a robot indication device located at the plurality of reference information obtaining spots.

5. The motion teaching apparatus according to claim 4, wherein the tool indication device is engageable with the robot indication device.

6. The motion teaching apparatus according to claim 4, wherein the tool indication device is configured to suck the robot indication device.

7. The motion teaching apparatus according to claim 2, wherein the teaching motion detection device comprises
   a passive multi-articular arm connected to the demonstration tool and configured to operate based on the position and the posture of the demonstration tool, and
   a sensor configured to detect a posture of the passive multi-articular arm.

8. The motion teaching apparatus according to claim 1, wherein the circuitry is configured to:
   obtain information indicating positions and postures of the demonstration tool detected by the teaching motion detection device with the tool indication device located at a plurality of coordinate system specified spots; and
   set a third coordinate system different from the first coordinate system and the second coordinate system based on the information obtained by the circuitry.

9. The motion teaching apparatus according to claim 1, wherein the tool indication device is attachable and detachable to and from the demonstration tool.

10. A robot system comprising:
   a robot comprising:
      a leading end; and
      a multi-articular arm configured to change a position of the leading end in a first coordinate system; and
   a motion teaching apparatus comprising:
      a demonstration device comprising:
         a demonstration tool to perform a demonstration to teach the robot how to move; and
         a teaching motion detection device configured to detect a position of the demonstration tool in a second coordinate system different from the first coordinate system; and
      circuitry configured to:
         derive coordinate system relationship information indicating a relationship between the first coordinate system and the second coordinate system based on a position of the demonstration tool in the first coordinate system at at least one spot and based on the position of the demonstration tool in the second coordinate system detected by the teaching motion detection device at the at least one spot;
         obtain a transition of the position of the demonstration tool detected by the teaching motion detection device during the demonstration using the demonstration tool; and
         generate a motion command to control motion of the leading end of the robot based on the transition and based on the coordinate system relationship information.

11. A motion teaching method comprising:
   performing a demonstration with a demonstration tool to teach a robot how to move, the robot including a leading end and a multi-articular arm which is configured to change a position of the leading end in a first coordinate system;
   detecting a position of the demonstration tool in a second coordinate system different from the first coordinate system;
   deriving coordinate system relationship information indicating a relationship between the first coordinate system and the second coordinate system based on a position of the demonstration tool in the first coordinate system at at least one spot and based on the position of the demonstration tool in the second coordinate system detected by the teaching motion detection device at the at least one spot;
   obtaining a transition of the position of the demonstration tool detected by the teaching motion detection device during the demonstration using the demonstration tool; and
   generating a motion command to control motion of the leading end of the robot based on the transition and based on the coordinate system relationship information.

12. The motion teaching apparatus according to claim 2, wherein the teaching motion detection device is configured to detect a plurality of positions and postures of the demonstration tool in a state in which a tool indication device provided at the demonstration tool stops, and
   wherein the circuitry is configured to:
      derive indication position information indicating a position of the tool indication device on the demonstration tool based on the plurality of positions and postures of the demonstration tool that have been detected; and
      derive the coordinate system relationship information based on the position and the posture of the demonstration tool detected by the teaching motion detection device and based on the indication position information.

13. The motion teaching apparatus according to claim 2, wherein the circuitry is configured to:
   derive, based on postures of the robot respectively corresponding to a plurality of reference information obtaining spots at which a robot indication device of the robot is located, information indicating positions of the plurality of reference information obtaining spots in the first coordinate system; and
   obtain information indicating positions and postures of the demonstration tool detected by the teaching motion detection device with the tool indication device in contact with the robot indication device located at the plurality of reference information obtaining spots.

14. The motion teaching apparatus according to claim 3, wherein the circuitry is configured to:
   derive, based on postures of the robot respectively corresponding to a plurality of reference information obtaining spots at which a robot indication device of the robot is located, information indicating positions of the plurality of reference information obtaining spots in the first coordinate system; and
   obtain information indicating positions and postures of the demonstration tool detected by the teaching motion detection device with the tool indication device in contact with the robot indication device located at the plurality of reference information obtaining spots.

15. The motion teaching apparatus according to claim 12, wherein the circuitry is configured to:

derive, based on postures of the robot respectively corresponding to a plurality of reference information obtaining spots at which a robot indication device of the robot is located, information indicating positions of the plurality of reference information obtaining spots in the first coordinate system; and obtain information indicating positions and postures of the demonstration tool detected by the teaching motion detection device with the tool indication device in contact with the robot indication device located at the plurality of reference information obtaining spots.

16. The motion teaching apparatus according to claim 13, wherein the tool indication device is engageable with the robot indication device.

17. The motion teaching apparatus according to claim 14, wherein the tool indication device is engageable with the robot indication device.

18. The motion teaching apparatus according to claim 15, wherein the tool indication device is engageable with the robot indication device.

19. The motion teaching apparatus according to claim 5, wherein the tool indication device is configured to suck the robot indication device.

20. The motion teaching apparatus according to claim 16, wherein the tool indication device is configured to suck the robot indication device.

21. The motion teaching apparatus according to claim 1, further comprising:
 a memory to store the position of the demonstration tool in the first coordinate system at the at least one spot.

22. The motion teaching apparatus according to claim 1, further comprising:
 a detector to detect the position of the demonstration tool in the first coordinate system.

23. The motion teaching apparatus according to claim 2, wherein the circuitry is configured to derive the posture information solely based on the posture of the demonstration tool.

* * * * *